(12) United States Patent
Kuramochi

(10) Patent No.: US 9,921,613 B2
(45) Date of Patent: Mar. 20, 2018

(54) BIAXIAL HINGE AND TERMINAL DEVICE USING THE SAME

(71) Applicant: KEM HONGKONG LIMITED, Tsimshatsui Kowloon (HK)

(72) Inventor: Ryuta Kuramochi, Kanagawa (JP)

(73) Assignee: Kem HongKong Limited, Tsimshatsui Kowloon (HK)

( * ) Notice: Subject to any disclaimer, the term of this patent is extended or adjusted under 35 U.S.C. 154(b) by 0 days.

(21) Appl. No.: 15/604,203

(22) Filed: May 24, 2017

(65) Prior Publication Data

US 2017/0351303 A1   Dec. 7, 2017

(30) Foreign Application Priority Data

Jun. 2, 2016   (JP) ................. 2016-110594

(51) Int. Cl.
| | |
|---|---|
| *G06F 1/16* | (2006.01) |
| *E05D 7/00* | (2006.01) |
| *E05D 3/06* | (2006.01) |
| *E05D 11/08* | (2006.01) |
| *F16C 11/04* | (2006.01) |

(52) U.S. Cl.
CPC ............ *G06F 1/1681* (2013.01); *E05D 3/06* (2013.01); *E05D 11/082* (2013.01); *F16C 11/04* (2013.01); *G06F 1/1616* (2013.01); *E05Y 2900/606* (2013.01)

(58) Field of Classification Search
CPC .......... G06F 1/1681; E05D 3/06; E05D 3/16; E05D 7/0009; E05D 7/0018; E05D 2007/0072

USPC .................................................. 361/679.55
See application file for complete search history.

(56) References Cited

U.S. PATENT DOCUMENTS

| | | | | |
|---|---|---|---|---|
| 8,385,991 | B2* | 2/2013 | Wang | E05D 3/18 16/221 |
| 8,638,546 | B2* | 1/2014 | Hoshino | G06F 1/1681 361/679.01 |
| 8,959,716 | B2* | 2/2015 | Hsu | E05D 3/06 16/302 |
| 9,677,308 | B1* | 6/2017 | Chen | E05D 3/18 |
| 9,727,093 | B2* | 8/2017 | Chuang | G06F 1/1681 |
| 2008/0109995 | A1* | 5/2008 | Kuwajima | H04M 1/022 16/354 |
| 2010/0041448 | A1* | 2/2010 | Gaddy | G06F 1/1616 455/575.3 |
| 2012/0096678 | A1* | 4/2012 | Zhang | G06F 1/1681 16/302 |
| 2012/0149438 | A1* | 6/2012 | Kwon | H04M 1/022 455/566 |

(Continued)

FOREIGN PATENT DOCUMENTS

JP   2016-001052 A   1/2016

*Primary Examiner* — Anthony Haughton
(74) *Attorney, Agent, or Firm* — Notaro, Michalos & Zaccaria P.C.

(57) ABSTRACT

A biaxial hinge has a first hinge portion which includes a first A hinge shaft, a second A hinge shaft, and a first radial direction coupling unit for coupling the first A hinge shaft and the second A hinge shaft. The biaxial hinge also has a second hinge portion which includes a first B hinge shaft and a second B hinge shaft, and a second radial direction coupling unit for coupling the first B hinge shaft and the second B hinge shaft. The biaxial hinge also has an axial direction coupling unit.

9 Claims, 23 Drawing Sheets

(56) References Cited

U.S. PATENT DOCUMENTS

2013/0016492 A1* 1/2013 Wang ..................... E05D 3/18
361/820
2016/0102487 A1* 4/2016 Kuramochi ............... E05D 3/12
361/679.27

* cited by examiner

FIG. 5A
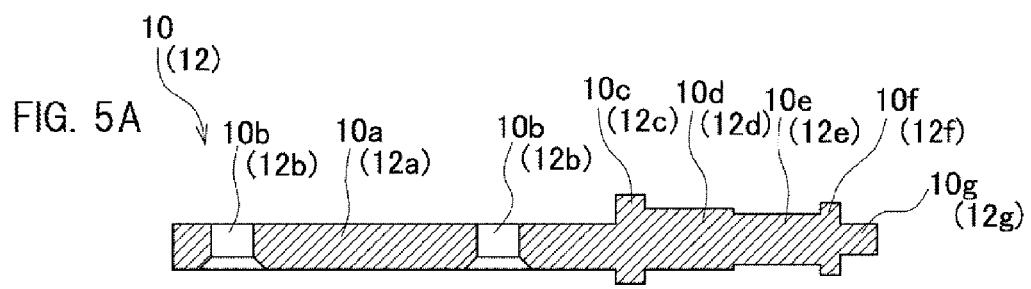
FIG. 5B
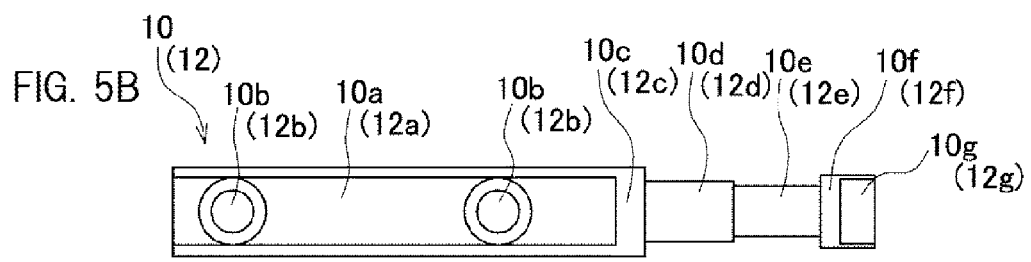
FIG. 5C
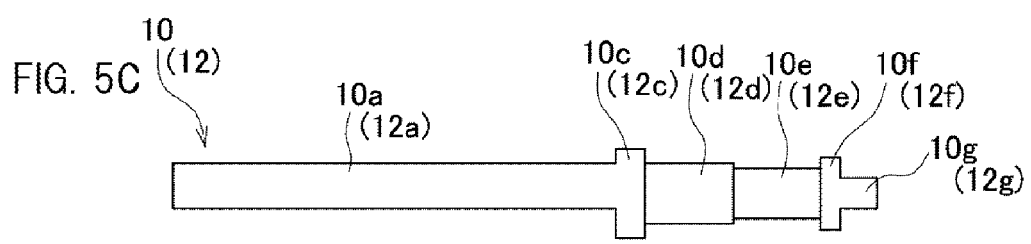
FIG. 5D
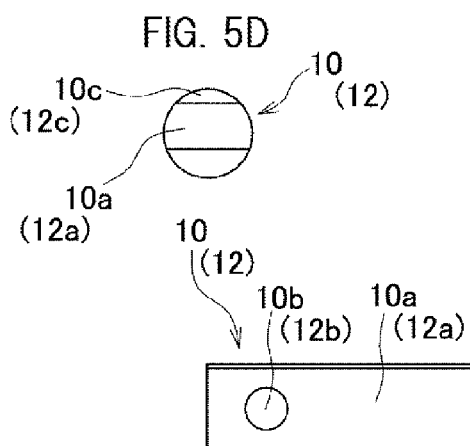
FIG. 5E
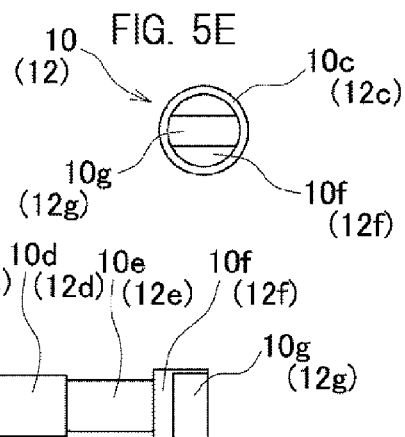
FIG. 5F FIG. 14A
FIG. 14B
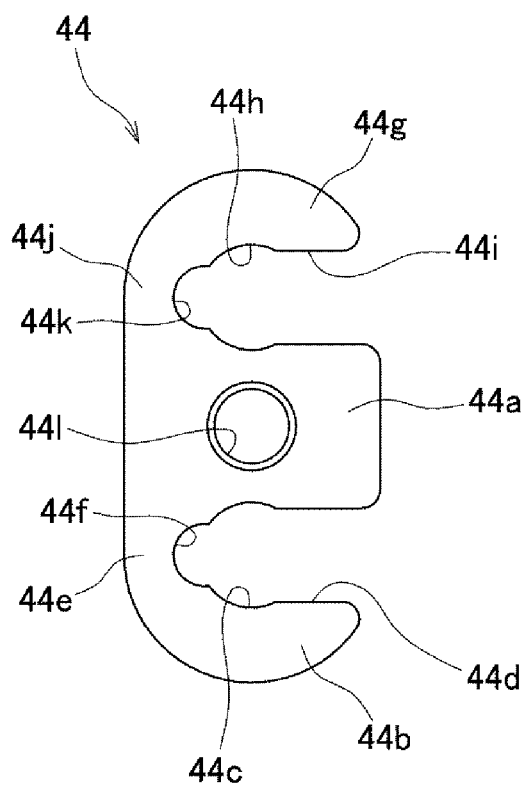
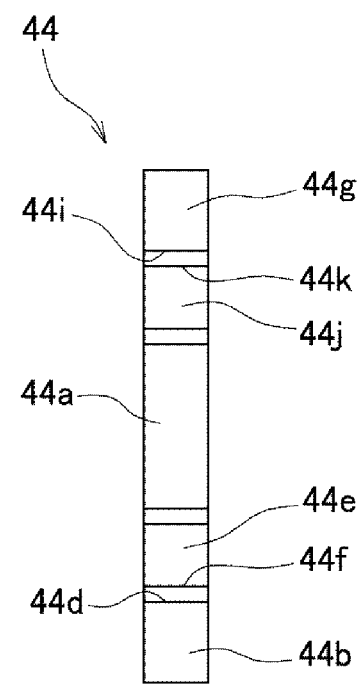

BIAXIAL HINGE AND TERMINAL DEVICE USING THE SAME

FIELD OF THE INVENTION

The invention relates to a biaxial hinge for opening and closing a first casing and a second casing of a terminal device such as a notebook PC, a mobile PC and PDA relative to each other, wherein the biaxial hinge can be attached to terminal devices with different distances between opening and closing axes of the both casings, once only a small number of parts is replaced. The invention further relates to a terminal device using such a biaxial hinge.

BACKGROUND ART

In a terminal device, such as a notebook PC, a mobile PC, a PDA and a mobile telephone, which comprises a first casing provided with a keyboard portion and a second casing provided with a display portion, a biaxial hinge which couples the first casing and the second casing is known.

Conventionally, among such biaxial hinges, the one described in JP Laid-Open Patent Application No. 2016-1052, which is proposed by the applicant, is known. In the biaxial hinge described in JP Laid-Open Patent Application No. 2016-1052, a first hinge shaft attached to a first casing and a second hinge shaft attached to a second casing are assembled via a plurality of coupling members such that these hinge shafts are rotatable in parallel to each other, wherein rotation controlling means consisting of synchronous rotation means, friction torque generating means, drawing means, and so on, for controlling a rotation of the first hinge shaft and the second hinge shaft are provided; the rotation controlling means can certainly control the rotation of the first hinge shaft and the second hinge shaft, but cannot adjust a distance between two axes of the first hinge shaft and the second hinge shaft.

On the other hand, a terminal device such as a notebook PC and a cellular phone faces a challenge to be thinner, and the challenge increases in importance year by year; and if a biaxial hinge as described above is used, there is a problem in that it is not compatible with a thinner terminal device, because the distance between two axes required for the hinge itself determines a thickness of a first casing and a second casing. Furthermore, a total thickness of terminal devices varies from manufacturer to manufacturer, which requires a manufacture of biaxial hinges with varying thickness depending on varying thickness of such terminal devices, so that a manufacture of the hinges is extremely complicated.

SUMMARY OF THE INVENTION

Therefore, an object of the invention is to provide a biaxial hinge compatible with terminal devices with varying thickness, and a terminal device using the biaxial hinge.

Solution to Problem

To achieve the above-mentioned object, a biaxial hinge according to a first aspect of the invention is a biaxial hinge of a terminal device consisting of four shafts, wherein the biaxial hinge couples a first casing and a second casing, such that these casings are openable and closable relative to each other; the biaxial hinge is characterized in that it comprises: a first hinge portion comprising a first A hinge shaft, wherein its one end is attached to a first attaching bracket fixed to the first casing, a second A hinge shaft, wherein its one end is attached to a second attaching bracket fixed to the second casing, and a first radial direction coupling means for coupling the first A hinge shaft and the second A hinge shaft so as to prevent the hinge shafts from moving away from each other in a radial direction, such that the hinge shafts are rotatable and a distance between their axes is adjustable, while the hinge shafts are further maintained in parallel to each other; a second hinge portion comprising a first B hinge shaft disposed in an axial direction of the first A hinge shaft, a second B hinge shaft disposed in an axial direction of the second A hinge shaft, a second radial direction coupling means for coupling the first B hinge shaft and the second B hinge shaft so as to prevent the hinge shafts from moving away from each other in a radial direction, such that the hinge shafts are rotatable, while the hinge shafts is further maintained in parallel to each other, and a rotation controlling means for controlling a rotation of the first B hinge shaft and the second B hinge shaft; and an axial direction coupling means comprising a joint holder for arresting respective free ends of the first A hinge shaft, the first B hinge shaft, the second A hinge shaft and the second B hinge shaft for preventing all of the hinge shafts from moving away from each other in an axial direction, a first joint piece and a second joint piece, which are both held by the joint holder for absorbing variations of a distance between axes and transmitting a rotation drive force to the first B hinge shaft and the second B hinge shaft.

Here, it is possible in the invention that a first radial direction coupling means comprising a single or a plurality of shaft portion holding members replaceably mounted to a first A hinge shaft and a second A hinge shaft, wherein the first A hinge shaft and the second A hinge shaft pass through the shaft portion holding members, and the first A hinge shaft and the second A hinge shaft are thus held by the shaft portion holding members.

Furthermore, it is possible in the invention that a rotation controlling means is a first friction torque generating means provided on a first B hinge shaft and a second friction torque generating means provided on a second B hinge shaft.

Still further, it is possible in the invention that a rotation controlling means is a first drawing means provided on a first B hinge shaft and a second drawing means provided on a second B hinge shaft.

Still further, the invention is characterized in that a first engaging groove engaging with a first A guide convex portion provided on an end portion of the first A hinge shaft is provided on one end portion of the first joint piece, such that the first engaging groove is slidable in a radial direction; a first engaging groove engaging with a second A guide convex portion provided on an end portion of the second A hinge shaft is provided on one end portion of the second joint piece, such that the first engaging groove is slidable in a radial direction; a second engaging groove engaging with a first B guide convex portion provided on an end portion of the first B hinge shaft is provided on one end portion of the first joint piece, such that the first engaging groove is slidable in a radial direction; and a second engaging groove engaging with a second B guide convex portion provided on an end portion of the second B hinge shaft is provided on one end portion of the second joint piece, such that the first engaging groove is slidable in a radial direction.

Still further, the invention is characterized in that a first joint piece and a second joint piece respectively comprising a first engaging groove engaging with a first A guide convex portion provided on an end portion of a first A hinge shaft and a second A guide convex portion provided on an end portion of a second A hinge shaft, wherein the first engaging groove is slidable in a radial direction on the first A guide convex portion and the second A guide convex portion, and a second engaging groove engaging with a first B guide convex portion provided on an end portion of said first B hinge shaft and a second B guide convex portion provided on an end portion of a second B hinge shaft, wherein the second engaging groove is slidable in a radial direction on the first B guide convex portion and the second B guide convex portion, wherein the engaging grooves are respectively integrally provided on respective one end portions of the first A hinge shaft and the second A hinge shaft.

Still further, the invention is characterized in that a first hinge portion, a second hinge portion and an axial direction coupling means are housed in a hinge case and thus fixed to the hinge case.

Still further, the invention is characterized in that shaft portion holding members respectively comprise a pair of holding grooves, and thus the shaft portion holding members are disposed in an axial direction, one after another facing the opposite direction.

Still further, a terminal device according to the invention is characterized in that it uses the above-mentioned biaxial hinge.

The present invention is constructed as described above, therefore, it is possible that a distance between axes of a first A hinge shaft and a second A hinge shaft of a first hinge portion is adjusted in a simple structure, so that it is compatible with a terminal device with varying thickness, without any modifications in structure and functions of a second hinge portion.

BRIEF DESCRIPTION OF THE DRAWINGS

FIGS. 5A to 5F show enlarged explanatory views of a first A hinge shaft (as well as a second A hinge shaft) in a biaxial hinge shown in FIGS. 2 to 4, FIG. 5A being its enlarged cross section across an axial direction, FIG. 5B being its enlarged plan view, FIG. 5C being its enlarged elevation view, FIG. 5D being its enlarged left hand side view, FIG. 5E being its enlarged right hand side view, and FIG. 5F being its enlarged bottom view;

FIGS. 14A and 14B show enlarged explanatory views of an attaching holding plate in a biaxial hinge shown in FIGS. 2 to 4, FIG. 14A being its enlarged right hand side view, and FIG. 14B being its enlarged back view;

EMBODIMENTS

Figure 1A:
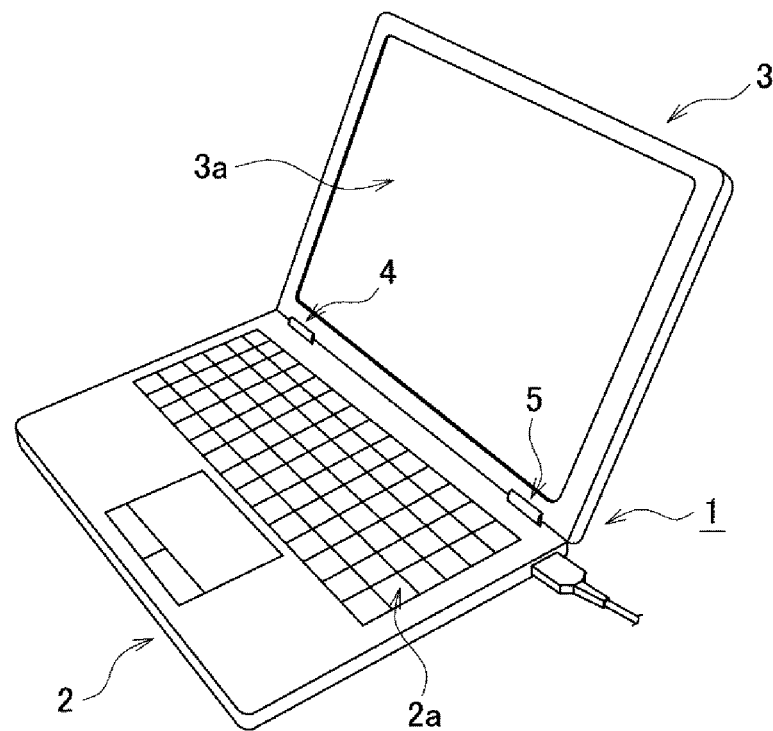
FIGS. 1A and 1B show a notebook PC being an example of a terminal device, with a biaxial hinge according to the invention being attached thereto, FIG. 1A being its perspective view as seen from front side, while a second casing are opened relative to a first casing, and FIG. 1B being its perspective view as seen from rear side, while a first casing and a second casing are closed.

Hereinafter, reference is made based on the drawings to the embodiments in which a biaxial hinge according to the invention is applied to a notebook PC being an example of a terminal device. The biaxial hinge according to the invention consists of four shafts, wherein the biaxial hinge couples a first casing and a second casing, such that these casings are openable and closable relative to each other; the biaxial hinge is characterized in that it comprises: a first hinge portion A comprising a first A hinge shaft 10, wherein its one end is attached to a first attaching bracket 11 fixed to the first casing 2, a second A hinge shaft 12, wherein its one end is attached to a second attaching bracket 13 fixed to the second casing 3, and a first radial direction coupling means 14 for coupling the first A hinge shaft 10 and the second A hinge shaft 12 so as to prevent the hinge shafts from moving away from each other in a radial direction, such that the hinge shafts are rotatable and a distance between their axes is adjustable, while the hinge shafts are further maintained in parallel to each other; a second hinge portion B comprising a first B hinge shaft 15 disposed in an axial direction of the first A hinge shaft 10, a second B hinge shaft disposed in an axial direction of the second A hinge shaft, a second radial direction coupling means D for coupling the first B hinge shaft 15 and the second B hinge shaft 16 in a radial direction so as to prevent the hinge shafts from moving away from each other in a radial direction, such that the hinge shafts are rotatable, while the hinge shafts is further maintained in parallel to each other, and a rotation controlling means E, as shown in particular in FIGS. 3 and 4, for controlling a rotation of the first B hinge shaft 15 and the second B hinge shaft 16; and an axial direction coupling means C comprising a joint holder 24 for arresting respective free ends of the first A hinge shaft 10, the first B hinge shaft 12, the second A hinge shaft 15 and the second B hinge shaft 16 for preventing all of the hinge shafts from moving away from each other in an axial direction, a first joint piece 22 and a second joint piece 23, which are both held by the joint holder 24 for absorbing variations of a distance between axes and transmitting a rotation drive force to the first B hinge shaft 15 and the second B hinge shaft 16.

However, as stated above, targeted terminal devices using the biaxial hinge according to the invention are not limited to a notebook PC, but the biaxial hinge is also widely applicable to other terminal devices such as a mobile PC, PDA and others which comprises a first casing and a second casing in an openable and closable manner. Still further, a first friction torque generating means and a second friction torque generating means are jointly referred to as friction torque generating means simply, and a first drawing means and a second drawing means are jointly referred to as drawing means simply. Still further, a first elastic means and a second elastic means are jointly referred to as elastic means simply.

Figure 1B:
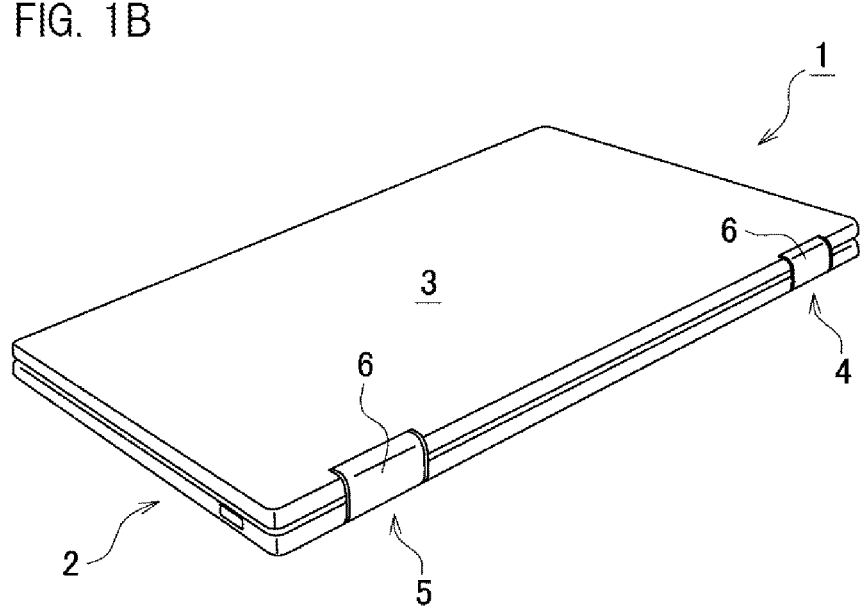

FIGS. 1A and 1B show a notebook PC 1 being an example of a terminal device using a biaxial hinge according to the invention. The notebook PC 1 comprises a first casing 2 provided with a key board portion 2a and a second casing 3 provided with a display portion 3a, wherein the casings are coupled via a pair of biaxial hinges 4 and 5 to each other at spots on the right and left sides of their respective rear portions, such that the casings can open and close relative to each other.

Since both biaxial hinges 4 and 5 have an identical structure except for their attaching direction in this case, reference will be made only to a biaxial hinge 4 in the following, and not to other biaxial hinge 5, if reference to the latter is not especially necessary.

[Structure of First Hinge Portion]

As shown in FIGS. 2 to 21C, a first hinge portion A comprises a first A hinge shaft 10, wherein its one end is attached to a first attaching bracket 11 fixed to a first casing 2, a second A hinge shaft 12, wherein its one end is attached to a second attaching bracket 13 fixed to a second casing 3, and a first radial direction coupling means 14 for the first A hinge shaft 10 and the second A hinge shaft 12 so as to prevent them from moving away from each other in a radial direction, such that the hinge shafts is rotatable and a distance between axes is adjustable, while the hinge shafts are further maintained in parallel to each other.

Particularly as shown in FIGS. 5A-5F, a first A hinge shaft 10 comprises, as seen from one end, an attaching plate portion 10a having a substantially flat cross section, wherein attaching holes 10b, 10b are provided on its surface; an intermediate flange portion 10c provided next to the attaching plate portion 10a; a large diameter circular shaft portion 10d provided next to the intermediate flange portion 10c; a small diameter circular shaft portion 10e provided next to the large diameter circular shaft portion 10d; a tip-side flange portion 10f provided next to the small diameter circular shaft portion 10e; and a first A guide convex portion 10g provided on a tip-side end surface of the tip-side flange portion 10f. A second A hinge shaft 12 has a structure identical to the first A hinge shaft 10, and further as relevant reference numerals are shown in parentheses in FIGS.

5A-5F, it comprises, as seen from one end, an attaching plate portion 12a having a substantially flat cross section, wherein attaching holes 12b, 12b are provided on its surface; an intermediate flange portion 12c provided next to the attaching plate portion 12a; a large diameter circular shaft portion 12d provided next to the intermediate flange portion 12c; a small diameter circular shaft portion 12e provided next to the large diameter circular shaft portion 12d; a tip-side flange portion 12f provided next to the small diameter circular shaft portion 10e; and a second A guide convex portion 12g provided on a tip-side end surface of the tip-side flange portion 12f.

As shown in FIGS. 2 to 5F, a first attaching bracket 11 is attached to an attaching plate portion 10a of a first hinge shaft 10; as per mode of attaching, the former is attached to the latter by caulking respective ends of attaching pins 10h, 10i, as the attaching pins pass through two attaching holes 10b, 10b of the first A hinge shaft 10 and attaching holes 11a, 11a of the first attaching bracket 11. And then, the first attaching bracket 11 is attached to an upper surface side of a first casing 2 using attaching screws (not shown) via three attaching holes 11b, 11b, 11b provided on the first attaching bracket 11. In the meantime, attaching screws with nuts can be used instead of the attaching pins 10h, 10i.

A second attaching bracket 13 is attached to an attaching plate portion 12a of a second A hinge shaft 12; as per mode of attaching, the former is attached to the latter by caulking respective ends of attaching pins 12h, 12i, as the attaching pins pass through two attaching holes 12b, 12b of the second A hinge shaft 12 and attaching holes 13a, 13a of the second attaching bracket 13. And then, the second attaching bracket 13 is attached to an upper surface side of a second casing 3 using attaching screws (not shown) via three attaching holes 13b, 13b, 13b provided on the second attaching bracket 13. In the meantime, attaching screws with nuts can be used instead of the attaching pins 12h, 12i.

[First Radial Direction Coupling Means]

Next, reference is made to a first radial direction coupling means 14 for holding a first A hinge shaft 10 and a second A hinge shaft 12, wherein the hinge shafts are maintained in parallel and rotatable, while a distance between their axes is variable. As shown in FIGS. 2 to 5F, the first radial direction coupling means 14 is constructed such that it is replaceable from the first A hinge shaft 10 and the second A hinge shaft 12 depending on a terminal device to which it is attached, so as to modify a distance between axes of the first A hinge shaft 10 and the second A hinge shaft 12, depending on the thickness and the specifications of the terminal device. The first radial direction coupling means 14 consists of four shaft portion holding members 141 to 144 which are attached to a small diameter circular shaft portion 10e of the first A hinge shaft 10 and a small diameter circular shaft portion 12e of the second A hinge shaft 12.

Figure 6:
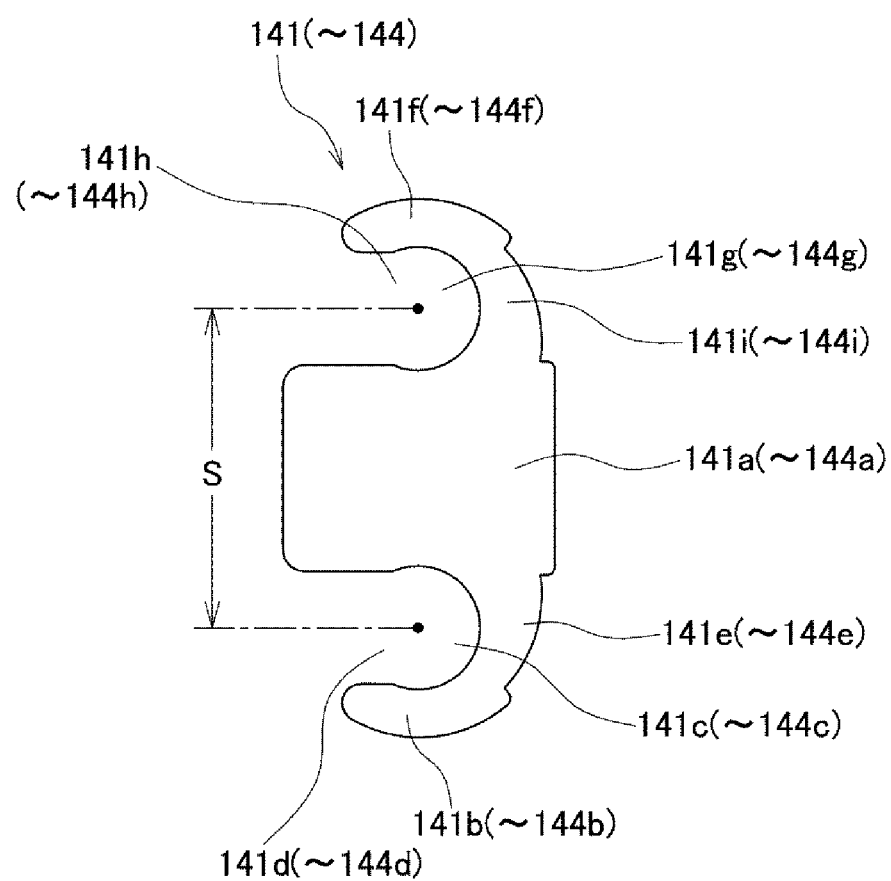
FIG. 6 shows an elevation view of one of shaft portion holding members being a first radial coupling means of a biaxial hinge shown in FIGS. 2 to 4.

In other words, these four shaft portion holding members 141 to 144 are elements of the same structure and of the same size. Each of the four shaft portion holding members 141 to 144 is constructed as shown in FIG. 6 (here a shaft portion holding member 141 is shown as separate piece), and it comprises a main body portion 141a (to 144a), a first hook portion 141b (to 144b), a first holding groove 141c (to 144c), an insertion port 141d (to 144d), a narrow width portion 141e (to 144e), a second hook portion 141f (to 144f), a second holding groove 141g (to 144g), an insertion port 141h (to 144h), a narrow width portion 141i (to 144i). The small diameter circular shaft portion 10e of the first A hinge shaft 10 is fit into the first holding groove 141c (to 144c) on a lower part, and the small diameter circular shaft portion 12e of the second A hinge shaft 12 into the second holding groove 141g (to 144g) on an upper part. Accordingly, a distance s (e.g. 5.05 mm) between axes of the first A hinge shaft 10 and the second A hinge shaft 12 is fixed depending on a distance s between centers of the first holding groove 141c (to 144c) and the second holding groove 141g (to 144g), and if other shaft portion holding members having a different distance between the centers of the grooves are used, they are compatible with a terminal device of other type.

In other words, in particular as shown in FIG. 6, respective widths of a first holding groove 141c (to 144c) and a second holding groove 141g (to 144g) are set to be equal to diameters of a small diameter circular shaft portion 10e of a first A hinge shaft 10 and a small diameter circular shaft portion 12e of a second A hinge shaft 12, respective opening widths of an insertion port 141d (to 144d) and an insertion port 141h (to 144h) are set to be slightly smaller than diameters of the first holding groove 141c (to 144c) and the second holding groove 141g (to 144g). In this manner, when a small diameter circular shaft portion 10e of the first A hinge shaft 10 and a small diameter circular shaft portion 12e of the second A hinge shaft 12 are fit through the insertion port 141d (to 144d) and the insertion port 141h (to 144h), a narrow width portion 141e (to 144e) and a narrow width portion 141i (to 144i) slightly bend and a first hook portion 141b (to 144b) expands outwards, so that the latter passes through the insertion port 141d (to 144d) and the insertion port 141h (to 144h), and then is held so as to be stably rotatable, as it reaches the first holding groove 141c (to 144c) and the second holding groove 141g (to 144g). As shown in FIG. 3 (see also FIG. 2), an adjacent shaft portion holding member 142 is fit facing a side opposite to a shaft portion holding member 141, and further shaft portion holding members 143 and 144 are fit such that each of them alternately faces a side opposite to adjacent ones. When shaft portion holding members 141 to 144 are attached to the first A hinge shaft 10 and the second A hinge shaft 12, it is also possible that a section of a small diameter shaft portion 10e of the first A hinge shaft 10 close to a tip-side flange portion 10f is preliminarily fit into a holding groove 24c of a joint holder 24, and a section of a small diameter shaft portion 12e of the second A hinge shaft 12 close to a tip-side flange portion 12f into a holding groove 24c of a joint holder 24.

In the meantime, the first holding groove 141c (to 144c) and the second holding groove 141g (to 144g) can be also replaced with a first holding hole and a second holding hole respectively; it is also possible the width between the first holding hole (wherein one first holding hole each is provided on each shaft portion holding member) and the second holding hole (wherein one second holding hole each is provided on each shaft portion holding member) is changed to be equal, so as to allow a distance between axes of the first A hinge shaft 10 and the second A hinge shaft 12 to be variable. However, it is necessary in this case to change the outer diameter of tip-side flange portions. Furthermore, the number of shaft portion holding members is not limited to the one in the embodiment.

[Structure of Second Hinge Portion]

Next, reference is made to a second hinge portion B. The second hinge portion B comprises a first B hinge shaft 15 disposed in an axial direction of a first A hinge shaft 10, a second B hinge shaft 16 disposed in an axial direction of a second A hinge shaft 12, a second radial direction coupling means D for the first B hinge shaft 15 and the second B hinge shaft 16 so as to prevent the hinge shafts from moving away from each other in a radial direction, such that the hinge shafts are rotatable, and the hinge shafts are further maintained in parallel to each other, and a rotation controlling means E for controlling a rotation of the first B hinge shaft 15 and the second B hinge shaft 16.

Figure 9A:
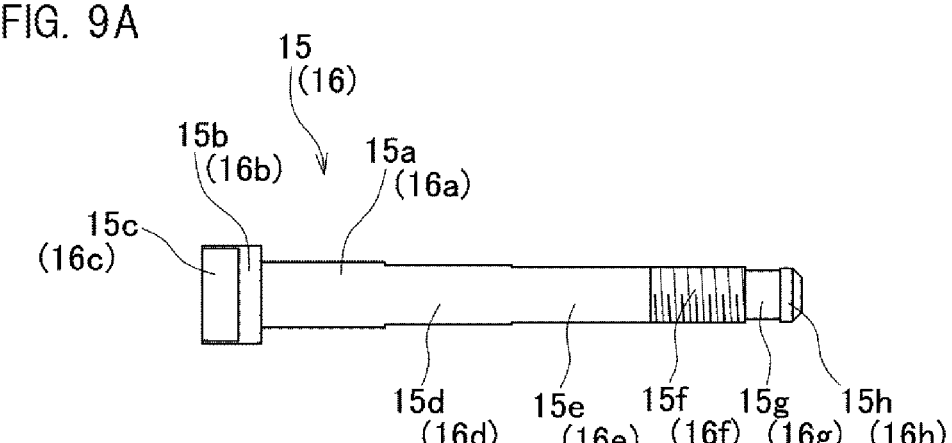
FIGS. 9A to 9C show enlarged explanatory views of a first B hinge shaft (as well as a second B hinge shaft) in a biaxial hinge shown in FIGS. 2 to 4, FIG. 9A being its enlarged elevation view, FIG. 9B being its enlarged plan view, and FIG. 9C being its enlarged left hand side view.
Figure 9B:
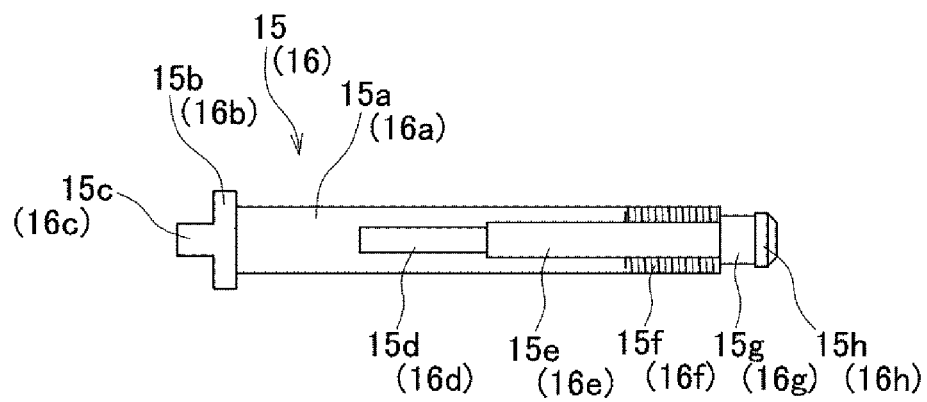
Figure 9C:
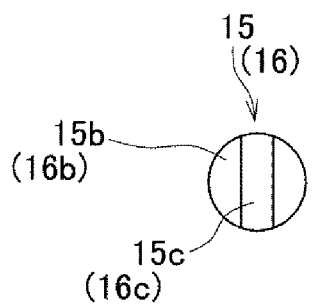
Figure 10A:
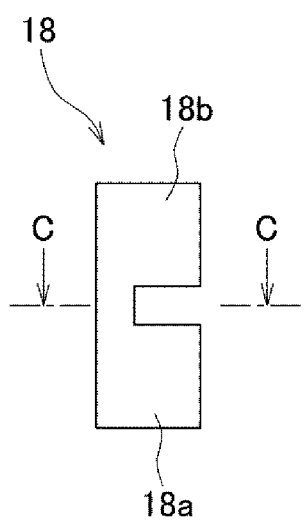
FIGS. 10A to 10C show enlarged explanatory views of a gear supporting member in a biaxial hinge shown in FIGS. 2 to 4, FIG. 10A being its enlarged elevation view, FIG. 10B being its enlarged right hand side view, and FIG. 10C being its enlarged cross section in line C-C.
Figure 10B:
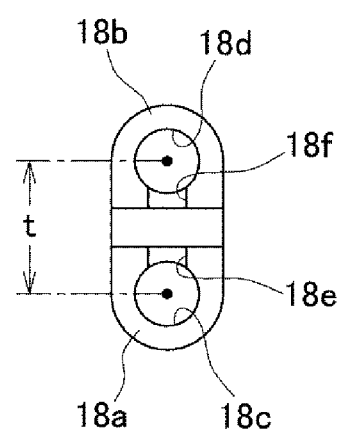
Figure 10C:
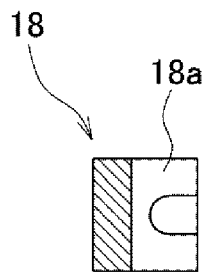
Figure 11A:
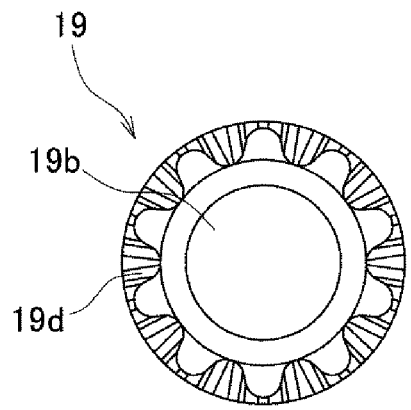
FIGS. 11A to 11C show enlarged explanatory views of an intermediate gear used in synchronous rotation means of a biaxial hinge shown in FIGS. 2 to 4, FIG. 11A being its enlarged plan view, FIG. 11B being its enlarged elevation view, and FIG. 11C being its enlarged plan view.
Figure 11B:
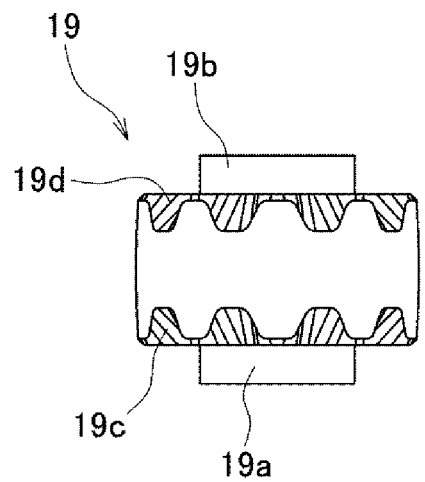
Figure 11C:
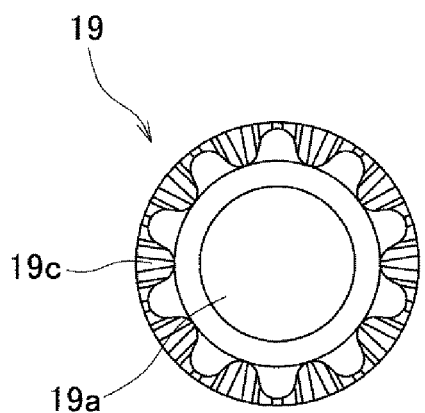
Figure 12A:
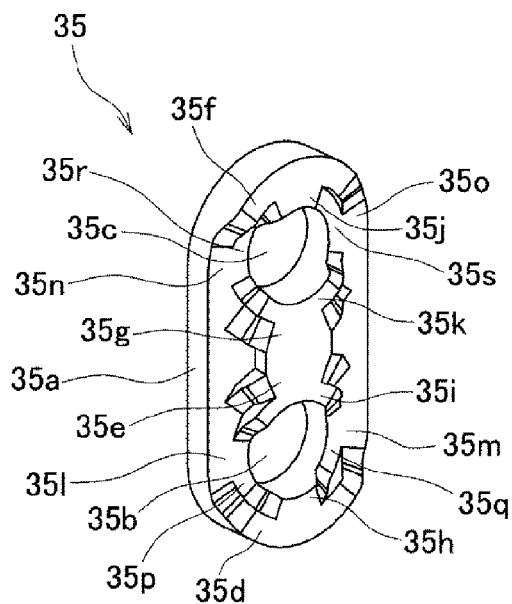
FIGS. 12A to 12D show enlarged explanatory views of a cam plate used in a first drawing means and a second drawing means of a biaxial hinge shown in FIGS. 2 to 4, FIG. 12A being its enlarged perspective view, FIG. 12B being its enlarged left hand side view, FIG. 12C being its enlarged elevation view, and FIG. 12D being its enlarged right hand side view.
Figure 12B:
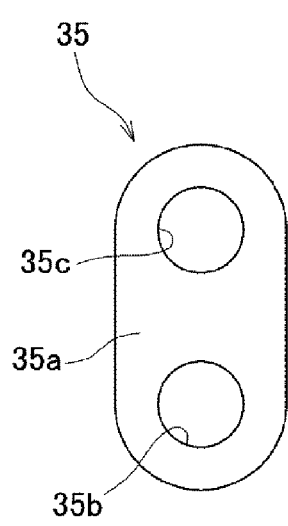
Figure 12C:
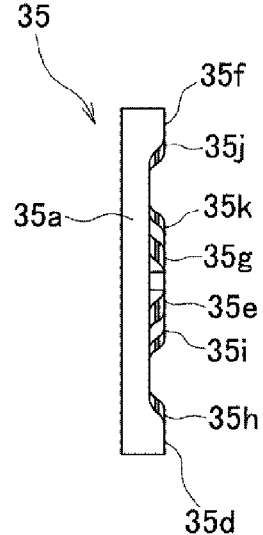
Figure 12D:
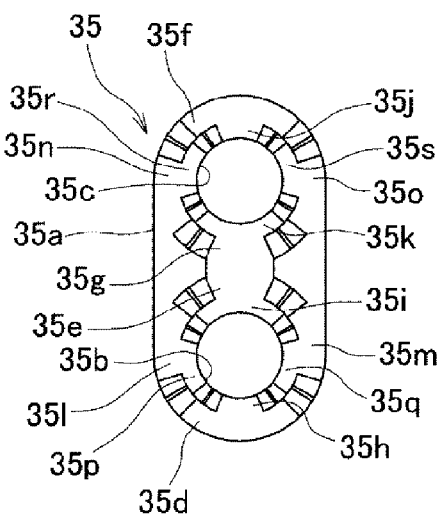
Figure 13A:
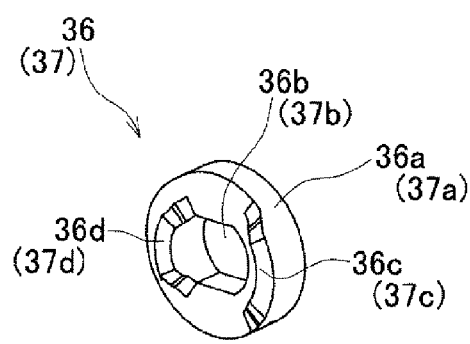
FIGS. 13A to 13D show enlarged explanatory views of a first cam follower (as well as a second cam follower) used in a first drawing means and a second drawing means of a biaxial hinge shown in FIGS. 2 to 4, FIG. 13A being its enlarged perspective view, FIG. 13B being its enlarged left hand side view, FIG. 13C being its enlarged elevation view, and FIG. 13D being its enlarged right hand side view.
Figure 13B:
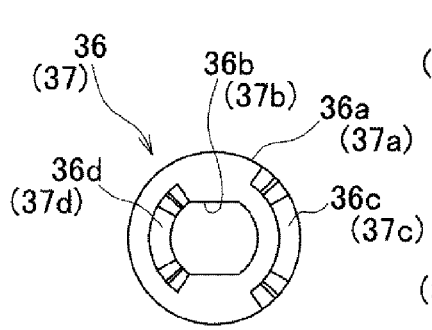
Figure 13C:
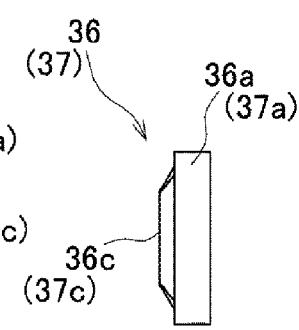
Figure 13D:
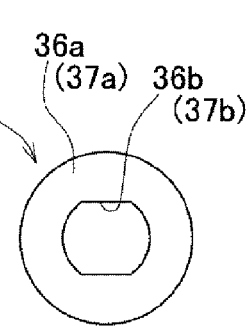
Figure 15A:
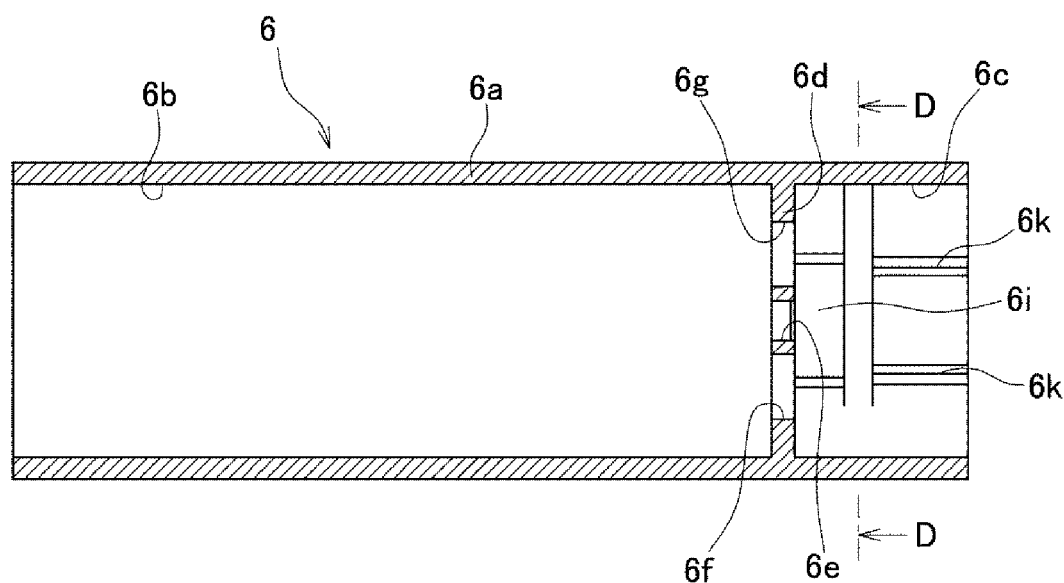
FIGS. 15A to 15D show enlarged explanatory views of a hinge case in a biaxial hinge shown in FIGS. 2 to 4, FIG. 15A being its enlarged cross section across an axial direction, FIG. 15B being its enlarged left hand side view, FIG. 15C being its enlarged cross section in line D-D, and FIG. 15D being its enlarged right hand side view.
Figure 15B:
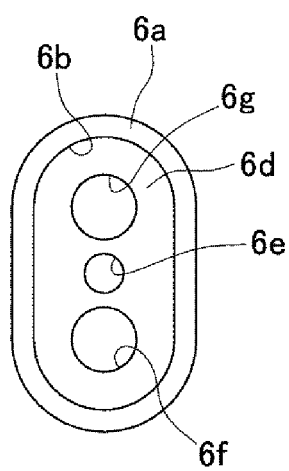
Figure 15C:
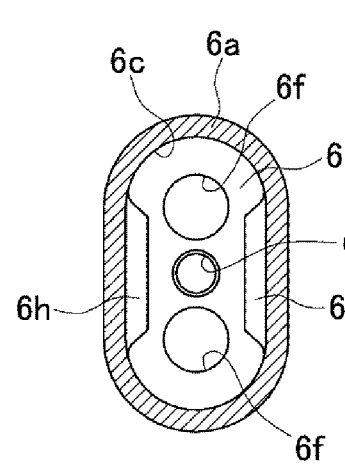
Figure 15D:
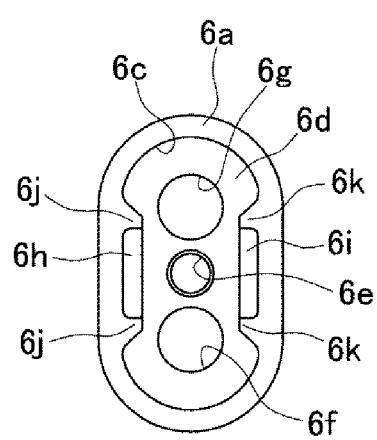

The first B hinge shaft 15 is constructed as shown in FIGS. 9A-9C (here the first B hinge shaft 15 is shown as separate piece), and it comprises a large diameter circular shaft portion 15a, an engaging flange portion 15b, a first B guide convex portion 15c, a first deformed shaft portion 15d, a further second deformed shaft portion 15e, a screw portion 15f, a small diameter circular shaft portion 15g and a tip-side engaging flange portion 15h. The second B hinge shaft 16 is constructed in the same manner as the first B hinge shaft 15, and it comprises a large diameter circular shaft portion 16a, an engaging flange portion 16b, a second B guide convex portion 16c, a first deformed shaft portion 16d, a further second deformed shaft portion 16e, a screw portion 16f, a small diameter circular shaft portion 16g and a tip-side engaging flange portion 16h.

Figure 2:
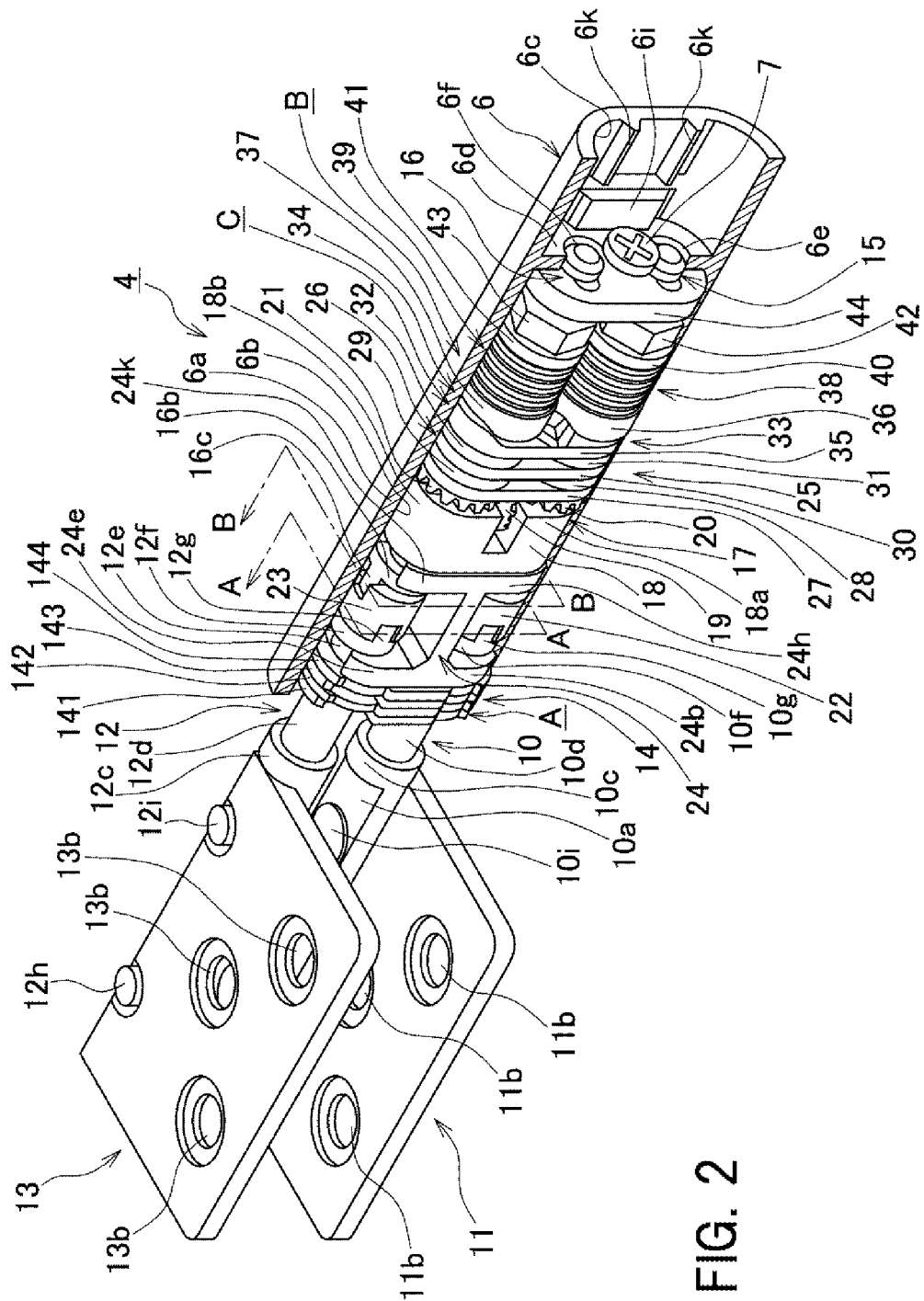
FIG. 2 shows a partially broken enlarged perspective view of a biaxial hinge according to the invention.
Figure 3:
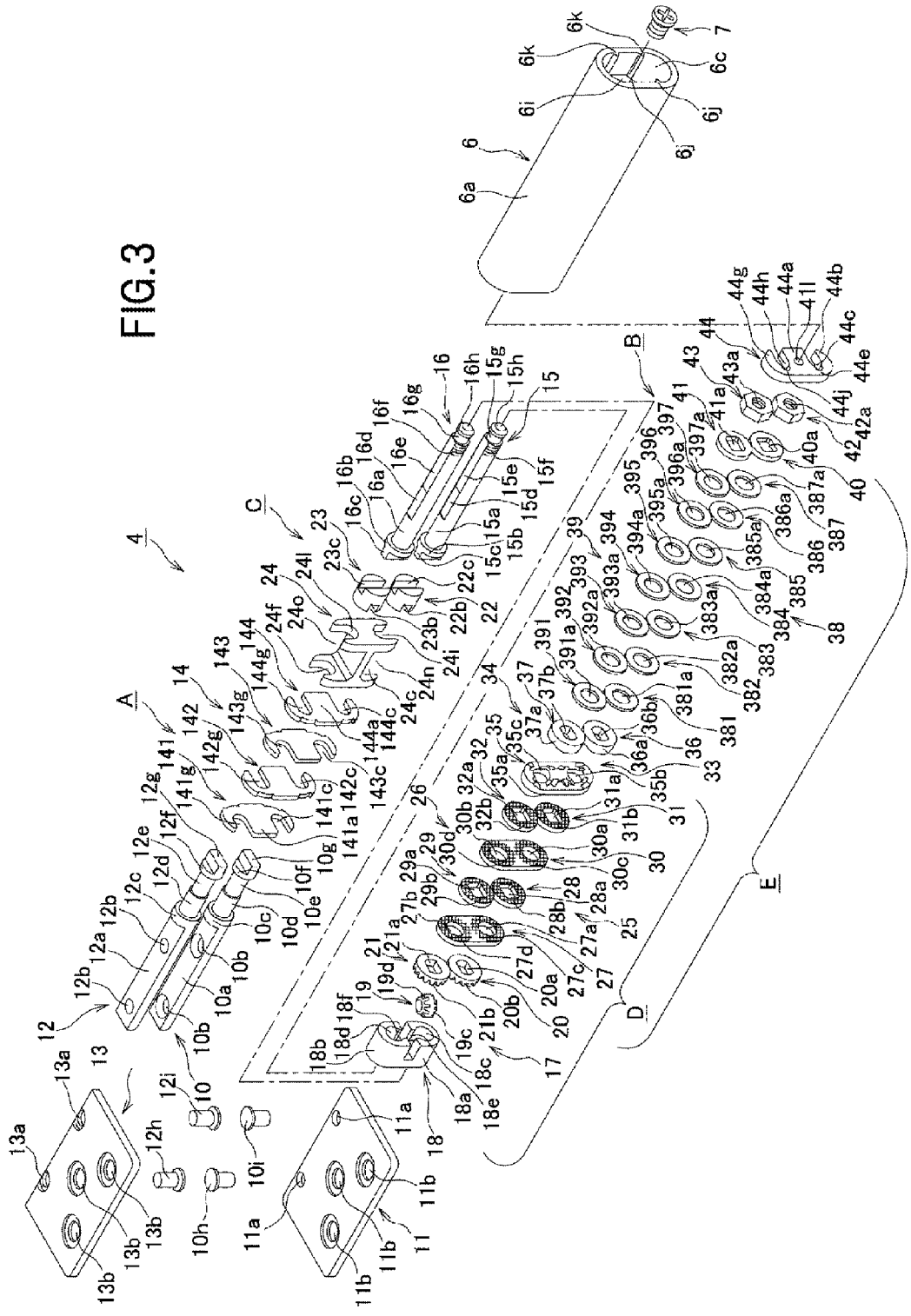
FIG. 3 shows an exploded perspective view of a biaxial hinge shown in FIG. 2.
Figure 4:
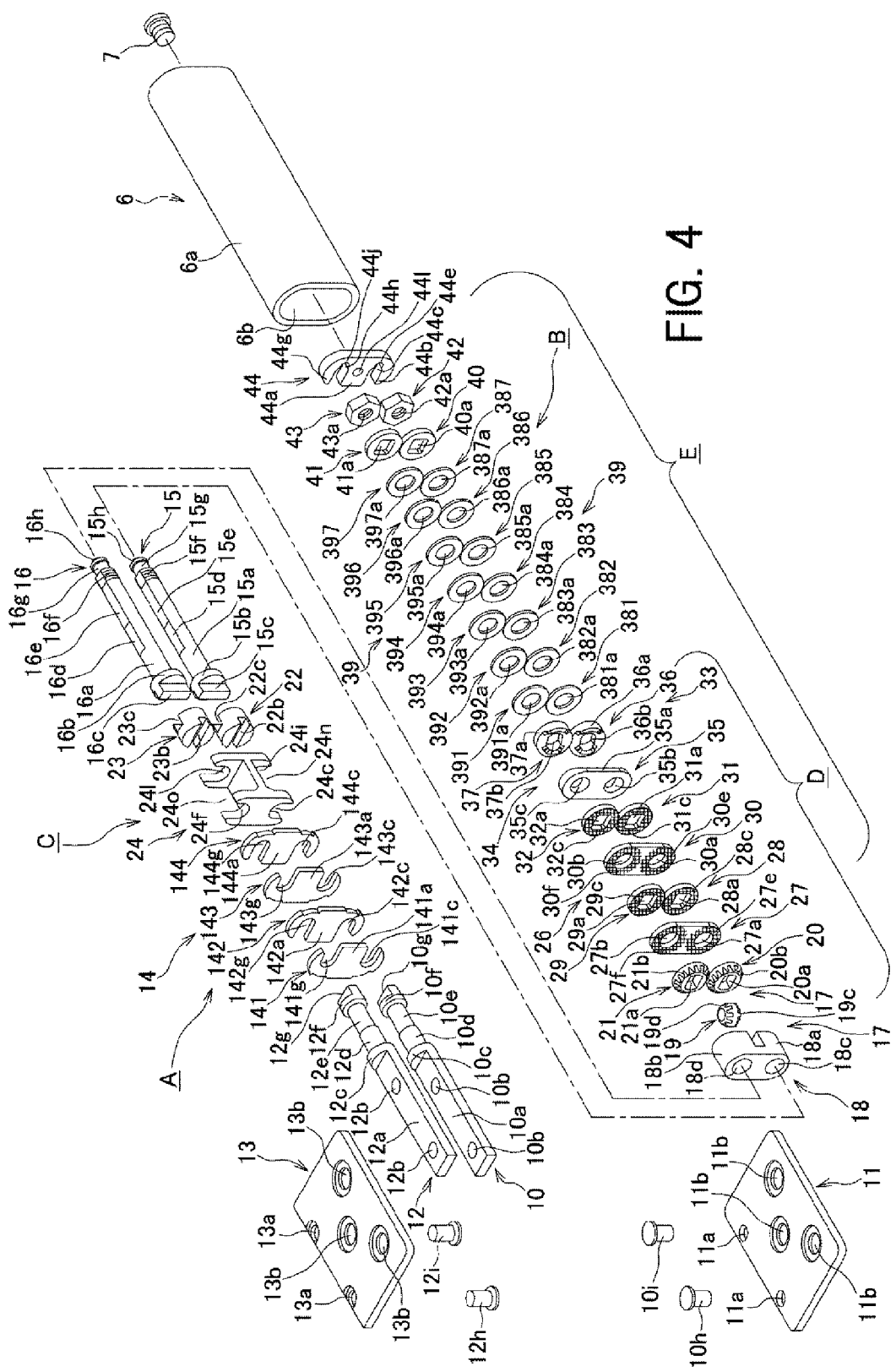
FIG. 4 shows an exploded perspective view of a biaxial hinge according to the invention as seen from a viewpoint different from FIG. 3.

As shown in FIGS. 2 to 4, a second radial direction coupling means D for coupling a first B hinge shaft 15 and a second B hinge shaft 16 in a radial direction, such that the hinge shafts are rotatable, and the hinge shafts are further maintained in parallel to each other, is provided between the first B hinge shaft 15 and the second B hinge shaft 16. The second radial direction coupling means D consists of a gear supporting member 18 of a synchronous rotation means 17 of a rotation controlling means E as described below in the embodiment, first friction plates 27 and second friction plates 30 of a first friction torque generating means 25 and a second friction torque generating means 26, and cam plates 35 and attaching holding plates 44 of a first drawing means 33 and a second drawing means 34, but components are not limited to those in this embodiment. In short, it is enough if the components overall can rotatably hold the first B hinge shaft 15 and the second B hinge shaft 16, while the hinge shafts are maintained in parallel.

Next, reference is made to a synchronous rotation means 17 of a rotation controlling means E. In particular as shown in FIGS. 3 and 4, the synchronous rotation means 17 comprises a gear supporting member 18, an intermediate gear 19, a first gear 20 and a second gear 21. Of these components, the gear supporting member 18 comprises a lower projecting portion 18a and an upper projecting portion 18b, and a first bearing hole 18c and a second bearing hole 18d are provided on each of the projecting portions; a large diameter shaft portion 15a of the first A hinge shaft 15 passes through the first bearing holes 18c, and a large diameter shaft portion 16a of the second B hinge shaft 16 through the second bearing holes 18d. Accordingly, a distance between centers of the first bearing hole 18c and the second bearing hole 18d is set to be equal to a distance t (e.g. 4.10 mm) between axes of the first A hinge shaft 15 and the second A hinge shaft 16. As shown in FIGS. 3 and 4, the first gear 20 comprises a bevel tooth portion 20b, and consists of a bevel gear, wherein a deformed shaft portion 15d of the first B hinge shaft 15 passes through and engages with a deformed insertion hole 20a provided on the central portion of the bevel tooth portion in an axial direction. In the same manner, the second gear 21 comprises a bevel tooth portion 21b, and consists of a bevel gear, wherein a deformed shaft portion 16d of the second B hinge shaft 16 passes through and engages with a deformed insertion hole 21a provided on the central portion of the bevel tooth portion in an axial direction. Moreover, the intermediate gear 19 (see also FIGS. 11A-11C) is assembled such that a lower support shaft 19a provided coaxially with a first shaft supporting groove 18e provided on an upper side of a lower projecting portion 18a is inserted into the first shaft supporting groove and supported by the latter so as to be rotatable, and an upper support shaft 18b provided coaxially with a second shaft supporting groove 18f provided on an upper side of a lower projecting portion 18a is inserted into the second shaft supporting groove and supported by the latter so as to be rotatable; and that a lower bevel tooth portion 19c provided on a lower portion of the intermediate gear meshes with the first gear 20, while an upper bevel tooth portion 19d provided on its upper portion—with the second gear 21.

Next, reference is made to an elastic means of a rotation controlling means E. As shown in FIGS. 3 and 4, the elastic means consist of a first elastic means 38 on the first B hinge shaft 15 side and a second elastic means 39 on the second B hinge shaft 16 side. The first elastic means 38 comprises a plurality of disc springs 381 to 387 being an example of elastic members, wherein a second deformed shaft portion 15e of a first B hinge shaft 15 passes through respective circular insertion holes 381a to 387a, and then the disc springs overlap each other; a first backing washer 40 provided next to the disc spring 387, wherein a second deformed shaft portion 15e of the first B hinge shaft 15 passes through a deformed insertion hole 40a of the first backing washer to engage with the deformed insertion hole; and a first fastening nut 42 provided next to the first backing washer 40, wherein a screw portion 15f of the first B hinge shaft 15 is screwed into a female screw hole 42a of the first fastening nut. In the meantime, known elastic members such as spring washers, compression springs or rigid resin can be used totally or in part instead of the disc springs, and their number is not limited to that in this embodiment.

In the same manner, the second elastic means 39 comprises a plurality of disc springs 391 to 397 being an example of elastic members, wherein a second deformed shaft portion 16e of a second B hinge shaft 16 passes through respective circular insertion holes 391a to 397a, and then the disc springs overlap each other; a second backing washer 41 provided next to the disc spring 397, wherein a second deformed shaft portion 16e of the first B hinge shaft 16 passes through a deformed insertion hole 40a of the first backing washer to engage with the deformed insertion hole; and a second fastening nut 43 provided next to the second backing washer 41, wherein a screw portion 16f of the second B hinge shaft 16 is screwed into a female screw hole 42a of the first fastening nut.

A first elastic means 38 and a second elastic means 39 as described above apply a press contact force to a first friction torque generating means 25 and a second friction torque generating means 26 (see FIGS. 3 and 4), as well as to a first drawing means 33 and a second drawing means 34, so that the friction torque generating means can exert a friction torque generating function while the drawing means a drawing function, when a first B hinge shaft 15 and a second B hinge shaft 16 rotate respectively at an opening and closing operation of a first casing 2 and a second casing 3.

In the following, reference is made to a friction torque generating means of a rotation controlling means E. As shown in FIGS. 2 to 4, the friction torque generating means is provided next to a synchronous rotation mechanism 17, and consists of a first friction torque generating means 25 on the first B hinge shaft 15 side and a second friction torque generating means 26 on the second B hinge shaft 16 side. Of these, the first friction torque generating means 25 comprises a first friction plate 27, a first friction washer 28, a second friction plate 30, a second friction washer 31 and a first elastic means 38 having a structure as described above. In the same manner, the second friction torque generating means 26 comprises a first friction plate 27, a third friction washer 29, a second friction plate 30, a fourth friction washer 32 and a second elastic means 39 having a structure as described above. Here, as shown in FIGS. 3 and 4, the first friction plate 27 (since the second friction plate 30 has an identical structure, respective reference numerals relevant to the second friction plate 30 is added in parenthesis to those concerning the first friction plate 27) comprises a first circular shaft hole 27a (30a) into which a first deformed shaft portion 15d of a first B hinge shaft 15 and a second circular shaft hole 27b (30b) into which a second deformed shaft portion 16d of a second B hinge shaft 16; waffle-knurl pattern portions 27c to 27f (30c to 30f) are respectively provided on the both sides around circumferences of the first circular shaft hole 27a (30a) and the second circular shaft hole 27b (30b). The first to fourth friction washers 28, 29, 31, 32 are adjacent to the first and the second friction plates 27 and 30, and provided such that they are brought into press contact with the first and the second friction plates 27 and 30 by the first and the second elastic means 38 and 39. Here, a first friction washer 28 (since the second to the fourth friction washers 29, 31, 32 have an identical structure, respective reference numerals relevant to corresponding components is added in parenthesis to those concerning the first friction washer 28) comprises a first deformed insertion hole 28a (29a, 31a, 32a) into which a first deformed shaft portion 15d of a first B hinge shaft 15; waffle-knurl pattern portions 28b, 28c (29b, 29c, 31b, 31c, 32b, 32c) are respectively provided on the both sides of the first (to the fourth) friction washers. In the meantime, the rotation of the first to the fourth friction washers 28, 29, 31, 32 is restrained relative to the first B hinge shaft 15 and the second B hinge shaft 16, but all are slidable in an axial direction.

Next, reference is made to a drawing means of a rotation controlling means E. The drawing means consists of a first drawing means 33 and a second drawing means 34 provided between a first and a second friction torque generating means 25, 26 and a first and a second elastic means 38, 39. First, the first drawing means 33 on the first B hinge shaft 15 side consists of a cam plate 35 (see FIGS. 12A-12D), a first cam follower 36 (see FIGS. 13A-13D) and the first elastic means 38 for bringing the first cam follower 36 into press contact with the cam plate 35. A large diameter first cam convex portion 35d, a large diameter second cam convex portion 35e, a small diameter first cam convex portion 35h, a small diameter second cam convex portion 35i respectively provided around a first bearing hole 35b on a lower part on one side portion of a main body portion 35a of the cam plate 35 are meshed with a large diameter cam convex portion 36c and a small diameter cam convex portion 36d respectively provided around a deformed bearing hole 36b on one side portion of a main body portion 36a of the first cam follower 36, and thus the cam plate and the cam follower rotate relative to each other; in this manner, a predetermined cam movement is performed. In the meantime, the rotation of the first cam follower 36 is restrained relative to the first B hinge shaft 15, but it is slidable in an axial direction. In the same manner, other drawing means, i.e. the second drawing means 34 on the second B hinge shaft 16 side consists of a cam plate 35 (see FIGS. 12A-12D), a second cam follower 37 (see FIGS. 13A-13D) and the second elastic means 39 for bringing the second cam follower 37 into press contact with the cam plate 35. A large diameter third cam convex portion 35f, a large diameter fourth cam convex portion 35g, a small diameter third cam convex portion 35j, a small diameter fourth cam convex portion 35j respectively provided around a second bearing hole 35c on an upper part on one side portion of the main body portion 35a of the cam plate 35 are meshed with a large diameter cam convex portion 37c and a small diameter cam convex portion 37d respectively provided around a deformed bearing hole 37b on one side portion of a main body portion 37a of the second cam follower 37, and thus the cam plate and the cam follower rotate relative to each other; in this manner, a predetermined cam movement is effected. In the meantime, the rotation of the second cam follower 37 is restricted relative to the second B hinge shaft 16, but it is slidable in an axial direction. In the meantime, cam concave portions 35l to 35s are shaped on remaining angle range other than the cam convex portions 35d to 35k of the cam plate 35. In an embodiment as shown in drawings, the cam concave portions 35l to 35s are shaped on an identical plane. In the meantime, it is also possible that waffle-knurl patterns are formed on top surfaces of the cam convex portions 35d to 35k as well as on the back surface of the cam plate 35, and further on the large diameter cam convex portion 36c and the small diameter cam convex portion 36d of the first cam follower 36 and on the large diameter cam convex portion 37c and the small diameter cam convex portion 37d of the second cam follower 37, in order to enhance a friction force generated between these waffle-knurl pattern portions and counterpart elements.

Next, an attaching holding plate 44 (see also FIGS. 14A-14B) is attached to a small diameter circular shaft portion 15g on the tip side of a first B hinge shaft 15 and a small diameter circular shaft portion 16g on the tip side of a second B hinge shaft 16, so as to hang over on the both small diameter circular shaft portions. The attaching holding plate 44 is constructed as shown in FIGS. 14A-14B, and it comprises a main body portion 44a, a first hook portion 44b, a first holding groove 44c, an insertion port 44d, a narrow width portion 44e, a notch portion 44f, a second hook portion 44g, a second holding groove 44h, an insertion port 44i, a narrow width portion 44j, a notch portion 44k and a screw hole 44l; the small diameter circular shaft portion 15g of the first B hinge shaft 15 is fit into the first holding groove 44c on a lower part, and the small diameter circular shaft portion 16e of the second B hinge shaft 16 into the second holding groove 44h on an upper part. In the meantime, in an embodiment as shown in FIGS. 14A-14B, respective diameters of the first holding groove 44c and the second holding groove 44g are set to be equal to diameters of the small diameter circular shaft portion 10g of the first B hinge shaft 15 and the small diameter circular shaft portion 16g of the second B hinge shaft 16, but respective opening widths of the insertion ports 44d and 44j are set to be slightly smaller than diameters of the first holding groove 44c and the second holding groove 44g. In this manner, when the small diameter circular shaft portion 10g of the first B hinge shaft 15 is fit through the insertion port 44d, the narrow width portion 44e with a reduced width due to arrangement of the notch portion 44f slightly bends and the first hook portion 44b expands downwards, so that the latter passes through the insertion port 44d, and then is held so as to be stably rotatable, as it reaches the first holding groove 44c. This also applies when the small diameter circular shaft portion 16g of the second B hinge shaft 16 is fit through the insertion port 44j into the second holding groove 44h.

[Axial Direction Coupling Means]

Figure 16:
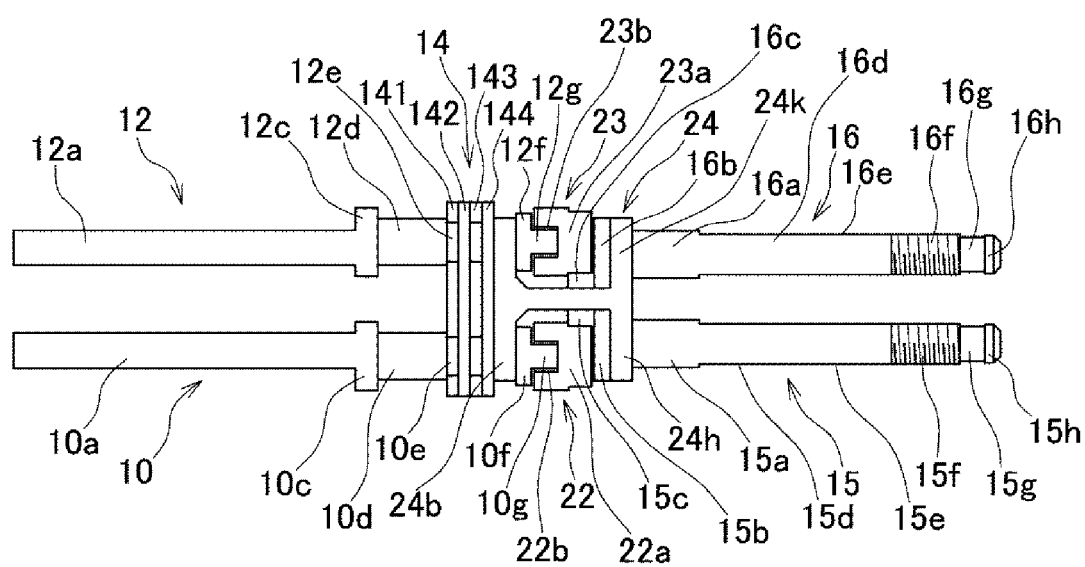
FIG. 16 shows an elevation view of a part of a shaft portion coupling means of a biaxial hinge shown in FIGS. 2 to 4.
Figure 17:
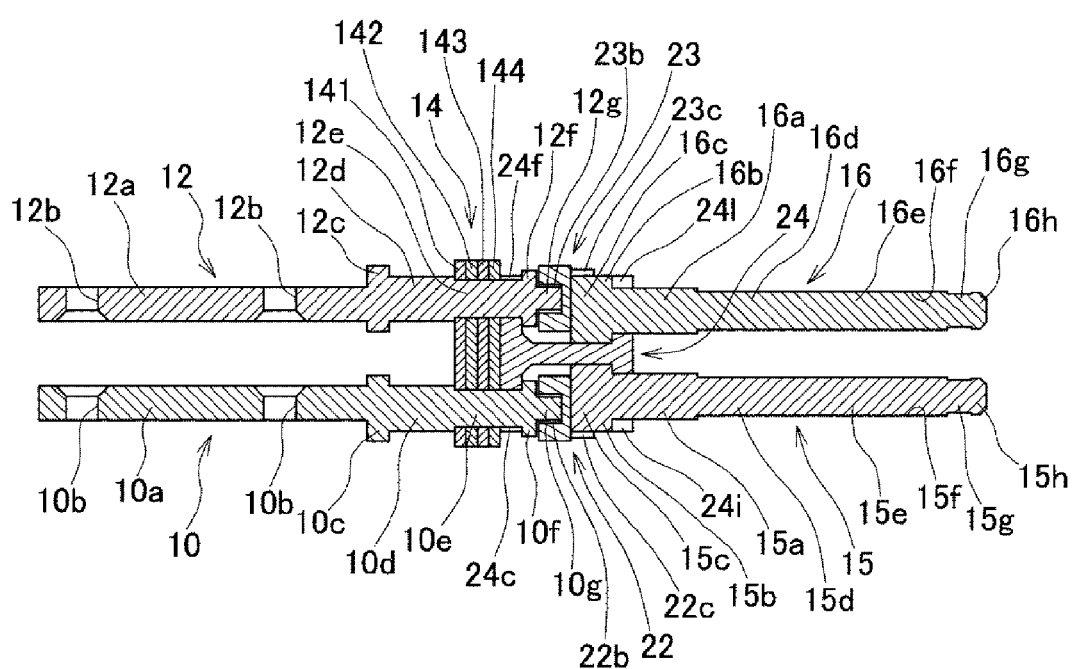
FIG. 17 shows a longitudinal cross section of a part of a shaft portion coupling means shown in FIG. 16.
Figure 18:
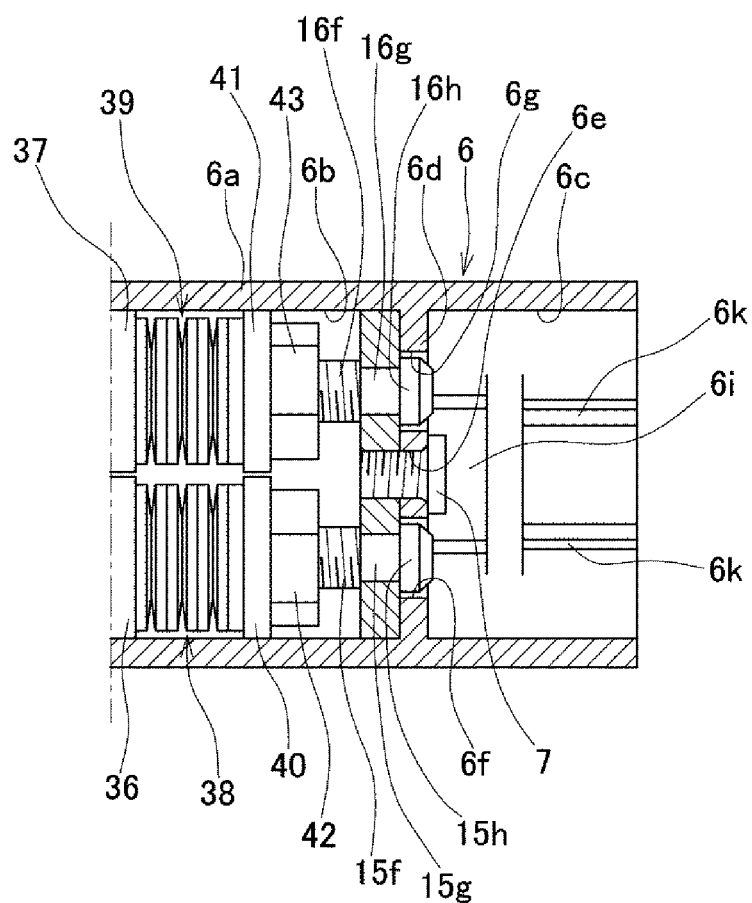
FIG. 18 shows a longitudinal cross section for illustrating a hinge case shown in FIG. 15, to which a second hinge portion is attached.

Next, reference is made to an axial direction coupling means C. In particular as shown in FIGS. 16 and 17, the axial direction coupling means C comprises a joint holder 24 for coupling a first A hinge shaft 10 to a second A hinge shaft 12, as well as a first B hinge shaft 15 to a second B hinge shaft 16, respectively in an axial direction, a first joint piece 22 and a second joint piece 23 for absorbing variations of a distance between axes of the first A hinge shaft 10 to the second A hinge shaft 12 and transmitting a rotation drive force of the first A hinge shaft 10 to the second A hinge shaft 12 to the first B hinge shaft 15 and the second B hinge shaft 16.

Figure 7A:
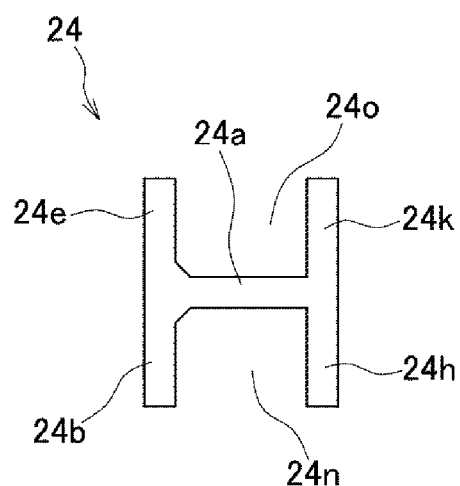
FIGS. 7A to 7C show enlarged explanatory views of a joint holder in a biaxial hinge shown in FIGS. 2 to 4, FIG. 7A being its enlarged elevation view, FIG. 7B being its enlarged left hand side view, and FIG. 7C being its enlarged right hand side view.
Figure 7B:
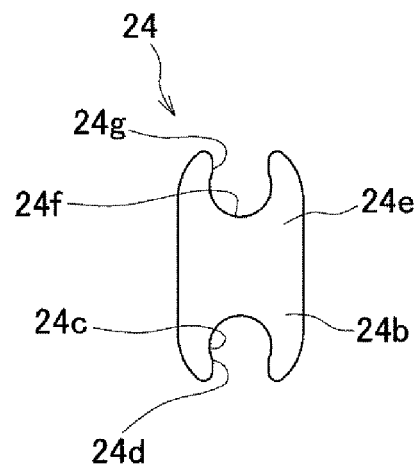
Figure 7C:
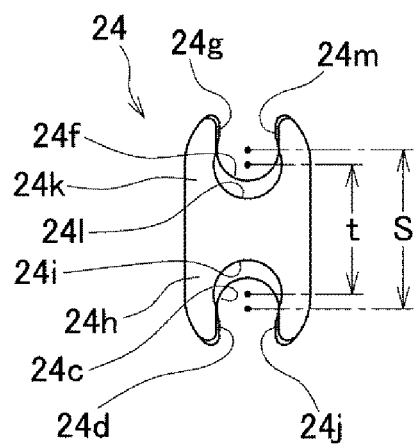

The joint holder 24 is constructed as shown in particular in FIGS. 7A-7C, and it comprises a main body portion 24*a*, a first A hinge shaft holding portion 24*b*, a holding groove 24*c*, an insertion port 24*d*, a second A hinge shaft holding portion 24*e*, a holding groove 24*f*, an insertion port 24*g*, a first B hinge shaft holding portion 24*h*, a holding groove 24*i*, an insertion port 24*j*, a second B hinge shaft holding portion 24*k*, a holding groove 24*l*, an insertion port 24*m*, a first joint piece housing portion 24*n* and a second joint piece housing portion 24*o*. A first joint piece 22 and a second joint piece 23 for transmitting a rotation movement of the first A hinge shaft 10 to the second A hinge shaft 12 respectively to the first B hinge shaft 15 and the second B hinge shaft 16 are respectively housed in and held by the first joint piece housing portion 24*n* and the second joint piece housing portion 24*o* (see also FIG. 2).

A holding groove 24*c* is provided on a first A hinge shaft holding portion 24*b* of a joint holder 24, wherein a small diameter shaft portion 10*e* of the first A hinge shaft 10 is rotatably fit into the holding groove, thus the small diameter shaft portion 10*e* of the first A hinge shaft 10 as pressed through an insertion port 24*d* with an opening width slightly narrower than the holding groove 24*c* is rotatably and stably held. In the same manner, a holding groove 24*f* is provided on a second A hinge shaft holding portion 24*e* of the joint holder 24, wherein a small diameter shaft portion 12*e* of the second A hinge shaft 12 is rotatably fit into the holding groove, thus the small diameter shaft portion 12*e* of the second A hinge shaft 12 as pressed through an insertion port 24*g* with an opening width slightly narrower than the holding groove 24*f* is rotatably and stably held. In this case, a distance between centers (see FIG. 7C) of the holding groove 24*c* and the holding groove 24*f* is set to be equal to a distance s (e.g. 5.05 mm) between axes of the first A hinge shaft 10 and the second A hinge shaft 12. Therefore, once a first radial direction coupling means 14 is replaced with the one having a different distance between axes, shaft portion holding members 141 to 144 and the joint holder 24 need to be replaced. However, it is also recommended that the holding grooves 24*c*, 24*f* of the joint holder 24 are cut deeper, specifically, the distance s between axes of the holding grooves 24*c*, 24*f* is set to be smaller than the distance s between axes of the shaft portion holding members 141 to 144, without replacing the joint holder 24 itself so as to make it compatible with shaft portion holding members 141 to 144 having various distances between axes. In other words, it is mandatory to replace the shaft portion holding members 141 to 144 with the ones having a different distance between axes, depending on various terminal devices to which they are attached, but the replacement of the joint holder 24 is not always indispensable, depending on its structure. In the meantime, the structure of a first radial direction coupling means 14 is not limited to that in the embodiment, and its form does not matter as long as the distance between axes of the first A hinge shaft 10 and the second A hinge shaft 12 can be kept at a defined value.

On the other hand, a holding groove 24*i* is provided on a first B hinge shaft holding portion 24*h* of the joint holder 24, wherein a large diameter shaft portion 15*a* of the first B hinge shaft 15 is rotatably fit into the holding groove, thus the large diameter shaft portion 15*a* of the first B hinge shaft 15 as pressed through an insertion port 24*j* with an opening width slightly narrower than the holding groove 24*i* is rotatably and stably held. In the same manner, a holding groove 24*l* is provided on a first B hinge shaft holding portion 24*h* of the joint holder 24, wherein a large diameter shaft portion 16*a* of the second B hinge shaft 16 is rotatably fit into the holding groove, thus the large diameter shaft portion 16*a* of the second B hinge shaft 16 as pressed through an insertion port 24*m* with an opening width slightly narrower than the holding groove 24*l* is rotatably and stably held. Accordingly, a distance between centers of the holding groove 24*i* and the holding groove 24*l* is set to be equal to a distance t (e.g. 4.10 mm) between axes of the first B hinge shaft 15 and the second B hinge shaft 16.

Figure 8A:
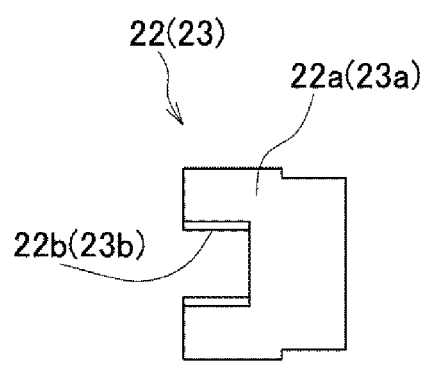
FIGS. 8A to 8C show enlarged explanatory views of a first joint piece (as well as a second joint piece) in a biaxial hinge shown in FIGS. 2 to 4, FIG. 8A being its enlarged elevation view, FIG. 8B being its enlarged left hand side view, and FIG. 8C being its enlarged right hand side view.
Figure 8B:
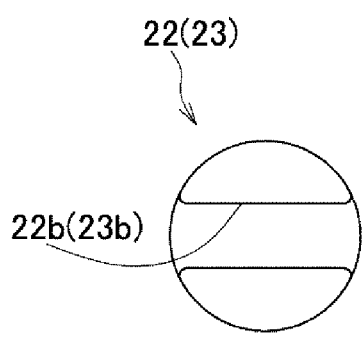
Figure 8C:
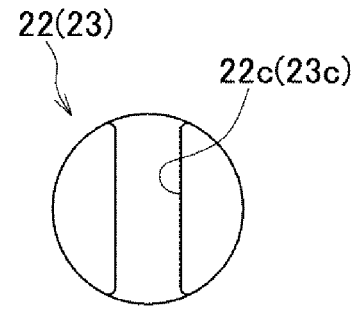

A first joint piece 22 and a second joint piece 23 have an identical structure. The first joint piece 22 is constructed as shown in FIGS. 8A-8C (here the first joint piece 22 is shown as separate piece), and it comprises a main body portion 22*a* in the shape of short cylinder, a first engaging groove 22*b* formed on its one end surface and consisting of a guide concave portion, and a second engaging groove 22*c* formed on its other end surface and consisting of a guide concave portion. The second joint piece 23 comprises a main body portion 23*a* in the shape of short cylinder, a first engaging groove 23*b* formed on its one end surface and consisting of a guide concave portion, and a second engaging groove 23*c* formed on its other end surface and equally consisting of a guide concave portion. The guide concave portions as first engaging groove 22*b* and first engaging groove 23*b* are desirably directed perpendicular to the guide concave portions as second engaging groove 22*c* and second engaging groove 23*c* as shown in FIGS. 3 and 4; however, the direction is not limited to as above described, and not particularly limited as long as they all are not directed in an identical direction.

A first A guide convex portion 10*g* provided on a shaft end of a first A hinge shaft 10 is slidably inserted into a guide concave portion as first engaging groove 22*b* of a first joint piece 22, while a first B guide convex portion 15*c* provided on a shaft end of a first B hinge shaft 15 into a guide concave portion as second engaging groove 22*c* of the first joint piece 22; in this manner, a rotation drive force of the first A hinge shaft 10 is transmitted to the first B hinge shaft 15 via the first joint piece 22.

In the same manner, a second A guide convex portion 12*g* provided on a shaft end of a second A hinge shaft 12 is slidably inserted into a guide concave portion as first engaging groove 23 of a second joint piece 23, while a second B guide convex portion 16*c* provided on a shaft end of a second B hinge shaft 16 into a guide concave portion as second engaging groove 23*c* of the second joint piece 23; in this manner, a rotation drive force of the second A hinge shaft 12 is transmitted to the second B hinge shaft 16 via the second joint piece 23.

Additionally, As shown in particular in FIG. 2, a hinge case 6 in which a first hinge portion A, a second hinge portion B and an axial direction coupling means C are housed and thus fixed is attached to a biaxial hinge 4 according to the invention. As shown in particular in FIGS. 2 to 4 and 15A-15D, a housing portion 6*b*, an attaching work space 6*c*, an attaching plate 6*d*, an attaching hole 6*e*, through holes 6*f*, 6*g*, reinforcing convex portions 6*h*, 6*i* and reinforcing convex stripes 6*j*, 6*k* are all provided in a cylindrical main body portion 6*a* of the hinge case 6 having a cross section in the shape of elongated hole; as shown in particular in FIG. 18, an attaching screw 7 inserted through the attaching hole 6e is screwed into a screw hole 441 of an attaching holding plate 44, so that a section from a first radial direction coupling means 14 to the attaching holding plate 44 can be fixed in the housing portion 6b. The through holes 6f, 6g provided on the attaching plate 6d in the hinge case 6 are holes in which tip-side engaging flange portions 15h, 16h of a first B and a second B hinge shafts 15, 16 can be inserted.

In the following, reference is made to the operation of the biaxial hinge 4 according to the invention as described above. The biaxial hinge 4 according to the invention is the one in which the first casing 2 and the second casing 3 being components of a notebook PC 1 being an example of terminal device can be opened and closed 360 degrees; it is characterized in that it is compatible with and attachable to various types of terminal devices with varying distances between axes of the first casing 2 and the second casing 3. This is explained in detail with reference to FIGS. 19A to 23C. As described above, FIGS. 19A to 19C are explanatory views illustrating an operation of the biaxial hinge 4 according to the invention, FIG. 19A being a side view of the biaxial hinge 4 in the state in which a second casing 3 is closed relative to a first casing 2, FIG. 19B being a cross section (position of section being a position along a line A-A shown in FIG. 2, this also applies hereinafter) showing a rotational position of the first A guide convex portion 10g of the first A hinge shaft 10 and the second A guide convex portion 12g of the second A hinge shaft 12 as well as the first joint piece 22 and the second joint piece 23 in the same state, FIG. 19C being a cross section (position of section being a position along a line B-B shown in FIG. 2, this also applies hereinafter) showing a rotational position of the first B guide convex portion 15c of the first B hinge shaft 15 and of the second B guide convex portion 16c of the second B hinge shaft 16 as well as the first joint piece 22 and the second joint piece 23 in the same state. In this state, as shown in FIG. 19B, the first A guide convex portion 10g of the first A hinge shaft 10 and the second A guide convex portion 12g of the second A hinge shaft 12 are both horizontally placed (see also FIGS. 2 to 4), and the distance between their axes is s (e.g. 5.05 mm). On the other hand, as shown in FIG. 19C, the first B guide convex portion 15c of the first B hinge shaft 15 and of the second B guide convex portion 16c of the second B hinge shaft 16 are both horizontally placed (see also FIGS. 2 to 4), and the distance between their axes is t (e.g. 4.10 mm).

Figure 19A:
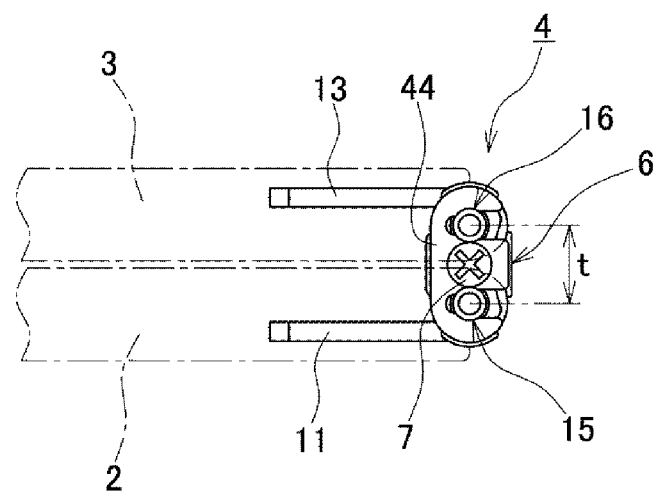
FIGS. 19A to 19C are explanatory views illustrating an operation of a biaxial hinge according to the invention, FIG. 19A being its side view in a state in which a second casing is closed relative to a first casing, FIG. 19B being a cross section (position of section being a position along a line A-A shown in FIG. 2, this also applies hereinafter) showing a rotational position of a first A hinge shaft and a second A hinge shaft as well as a first joint piece and a second joint piece in the same state, FIG. 19C being a cross section (position of section being a position along a line B-B shown in FIG. 2, this also applies hereinafter) showing a rotational position of a first B hinge shaft and a second B hinge shaft as well as a first joint piece and a second joint piece in the same state.
Figure 19B:
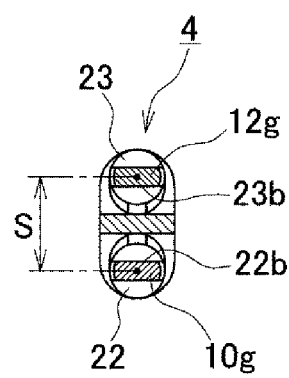
Figure 19C:
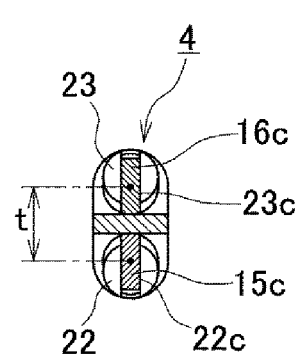
Figure 20A:
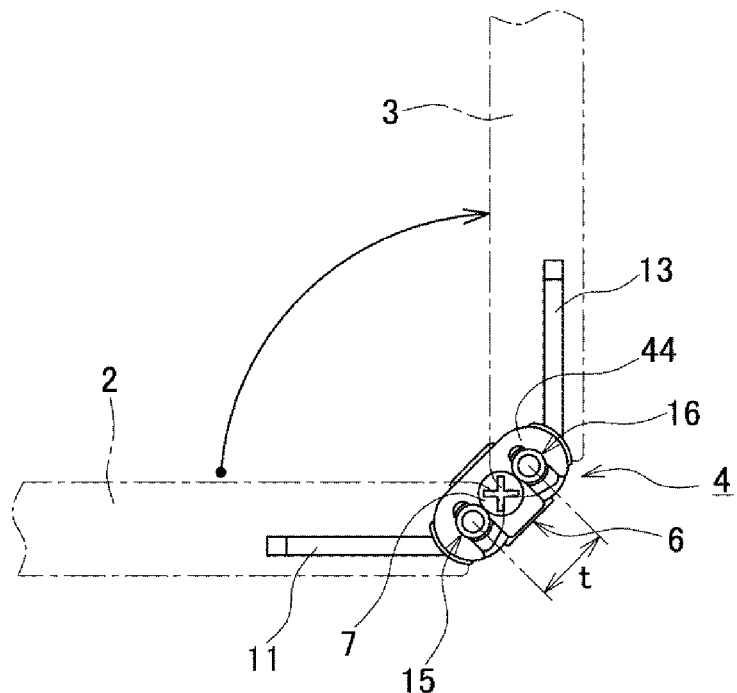
FIGS. 20A to 20C are explanatory views illustrating an operation of a biaxial hinge according to the invention, FIG. 20A being its side view in a state in which a second casing is opened 90 degrees relative to a first casing, FIG. 20B being a cross section showing a rotational position of a first A hinge shaft and a second A hinge shaft as well as a first joint piece and a second joint piece in the same state, FIG. 20C being a cross section showing a rotational position of a first B hinge shaft and a second B hinge shaft as well as a first joint piece and a second joint piece in the same state.
Figure 20B:
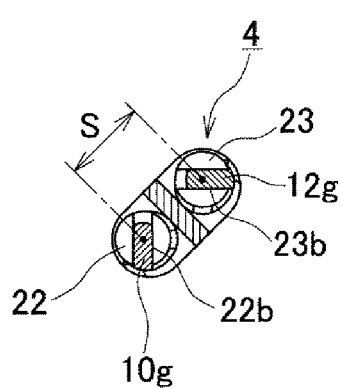
Figure 20C:
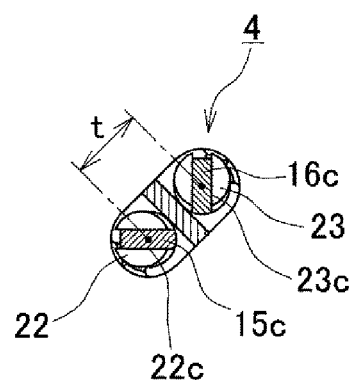

When a shift is made from the state in which the second casing 3 is closed relative to the first casing 2, as shown in FIGS. 19A-19C, to the state in which the both casings are opened 90 degrees relative to each other, as shown in FIG. 20A, the first A guide convex portion 10g of the first A hinge shaft 10 and the second A guide convex portion 12g of the second A hinge shaft 12 intersect at right angles with maintaining the distance s between their axes, and the first joint piece 22 and the second joint piece 23 have made a slide movement relative to the first A guide convex portion 10g of the first A hinge shaft 10 and the second A guide convex portion 12g of the second A hinge shaft 12, as shown in FIG. 20B. On the other hand, the first B guide convex portion 15c of the first B hinge shaft 15 and the second B guide convex portion 16c of the second B hinge shaft 16 intersect at right angles with maintaining the distance t between their axes, as shown in FIG. 20C, and the first joint piece 22 and the second joint piece 23 have made a slide movement relative to the first A guide convex portion 10g of the first A hinge shaft 15 and the second A guide convex portion 12g of the second A hinge shaft 16 from the state shown in FIGS. 19A-19C. In other words, in a process of shift from the state in which the first casing 2 and the second casing 3 are closed relative to each other, as shown in FIGS. 19A-19C to the state in which the both casings are opened 90 degrees as shown in FIGS. 20A-20C, the distance s between the axes of the first A hinge shaft 10 and the second A hinge shaft 12 remains constant, and the distance t between the axes of the first A hinge shaft 15 and the second A hinge shaft 16 also remains constant. The rotation transmission from the first A hinge shaft 10 to the first B hinge shaft 15 is smoothly conducted via the first joint piece 22 having made a slide movement in a radial direction, and the one from the second A hinge shaft 12 to the second B hinge shaft 16 as well, via the second joint piece 23 having made a slide movement in a radial direction.

Figure 21A:
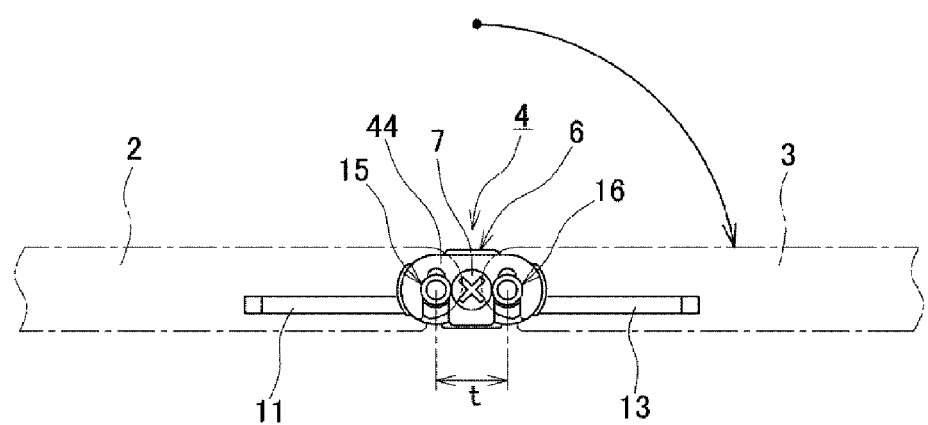
FIGS. 21A to 21C are explanatory views illustrating an operation of a biaxial hinge according to the invention, FIG. 21A being its side view in a state in which a second casing is opened 180 degrees relative to a first casing, FIG. 21B being a cross section showing a rotational position of a first A hinge shaft and a second A hinge shaft as well as a first joint piece and a second joint piece in the same state, FIG. 21C being a cross section showing a rotational position of a first B hinge shaft and a second B hinge shaft as well as a first joint piece and a second joint piece in the same state.
Figure 21B:
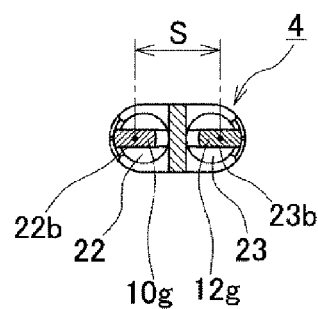
Figure 21C:
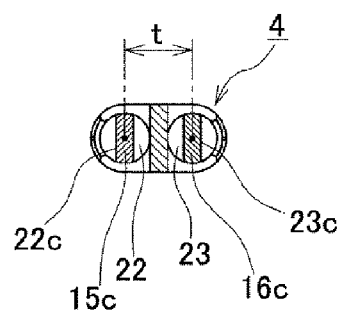

Next, when a shift is made from the state in which the second casing 3 is opened 90 degrees relative to the first casing 2, as shown in FIG. 20A, to the state in which the both casings are opened 180 degrees relative to each other, as shown in FIG. 21A, the first A guide convex portion 10g of the first A hinge shaft 10 and the second A guide convex portion 12g of the second A hinge shaft 12 are both horizontally placed with maintaining the distance s between their axes, and the first joint piece 22 and the second joint piece 23 have made a slide movement relative to the first A guide convex portion 10g of the first A hinge shaft 10 and the second A guide convex portion 12g of the second A hinge shaft 12, as shown in FIG. 21B. On the other hand, the first B guide convex portion 15c of the first B hinge shaft 15 and the second B guide convex portion 16c of the second B hinge shaft 16 are both vertically placed with maintaining the distance t between their axes, as shown in FIG. 21C, and the first joint piece 22 and the second joint piece 23 have made a further slide movement relative to the first B guide convex portion 15c of the first B hinge shaft 15 and the second B guide convex portion 16c of the second B hinge shaft 16 from the state shown in FIGS. 20A-20C. In other words, in a process of shift from the state in which the second casing 3 is opened 90 degrees relative to the first casing 2, as shown in FIGS. 20A-20C, to the state in which the both casings are opened 180 degrees as shown in FIGS. 21A-20C, the distance s between the axes of the first A hinge shaft 10 and the second A hinge shaft 12 remains constant, and the distance t between the axes of the first B hinge shaft 15 and the second B hinge shaft 16 also remains constant. The rotation transmission from the first A hinge shaft 10 to the first B hinge shaft 15 is smoothly conducted via the first joint piece 22 having made a slide movement in a radial direction, and the one from the second A hinge shaft 12 to the second B hinge shaft 16 as well, via the second joint piece 23 having made a slide movement in a radial direction.

Figure 22A:
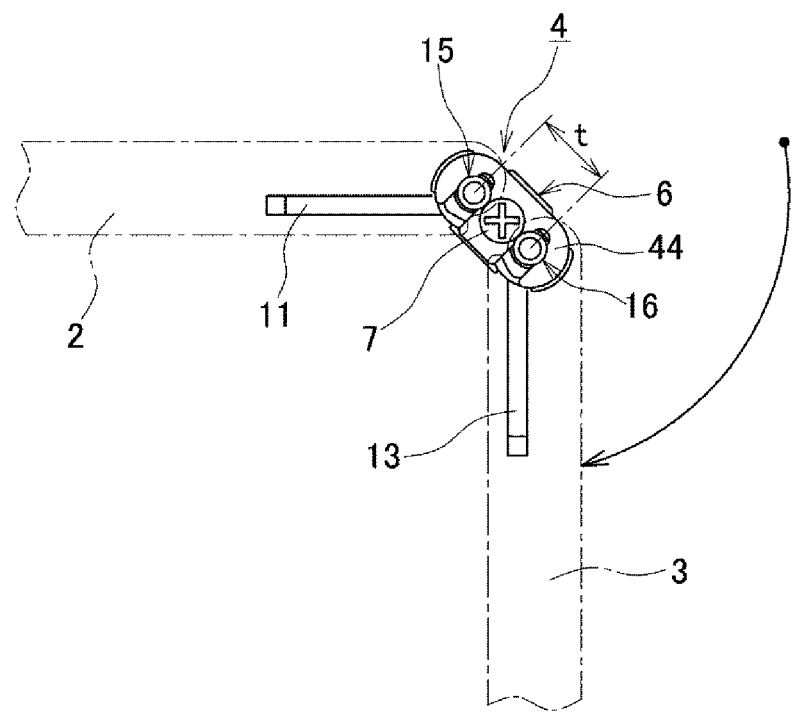
FIGS. 22A to 22C are explanatory views illustrating an operation of a biaxial hinge according to the invention, FIG. 22A being its side view in a state in which a second casing is opened 270 degrees relative to a first casing, FIG. 22B being a cross section showing a rotational position of a first A hinge shaft and a second A hinge shaft as well as a first joint piece and a second joint piece in the same state, FIG. 22C being a cross section showing a rotational position of a first B hinge shaft and a second B hinge shaft as well as a first joint piece and a second joint piece in the same state.
Figure 22B:
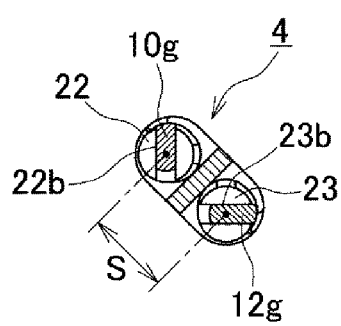
Figure 22C:
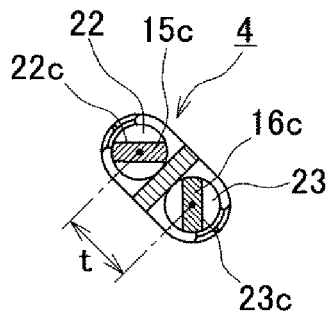

When a shift is made from the state in which a second casing 3 is opened 180 degrees relative to a first casing 2, as shown in FIGS. 21A-21C, to the state in which the both casings are opened 270 degrees relative to each other, as shown in FIG. 22A, the first A guide convex portion 10g of the first A hinge shaft 10 and the second A guide convex portion 12g of the second A hinge shaft 12 intersect at right angles with maintaining the distance s between their axes, and the first joint piece 22 and the second joint piece 23 have made a slide movement relative to the first A guide convex portion 10g of the first A hinge shaft 10 and the second A guide convex portion 12g of the second A hinge shaft 12, as shown in FIG. 22B. On the other hand, the first B guide convex portion 15c of the first B hinge shaft 15 and the second B guide convex portion 16c of the second B hinge shaft 16 intersect at right angles with maintaining the distance t between their axes, as shown in FIG. 22C, and the first joint piece 22 and the second joint piece 23 have made a further slide movement relative to the first B guide convex portion 15c of the first B hinge shaft 15 and the second B guide convex portion 16c of the second B hinge shaft 16 from the state shown in FIGS. 21A-21C. In other words, in a process of shift from the state in which and the second casing 3 are opened 180 degrees relative to the first casing 2, as shown in FIGS. 21A-21C to the state in which the both casings are opened 270 degrees as shown in FIGS. 22A-22C, the distance s between the axes of the first A hinge shaft 10 and the second A hinge shaft 12 remains constant, and the distance t between the axes of the first A hinge shaft 15 and the second A hinge shaft 16 also remains constant. The rotation transmission from the first A hinge shaft 10 to the first B hinge shaft 15 is smoothly conducted via the first joint piece 22 having made a slide movement in a radial direction, and the one from the second A hinge shaft 12 to the second B hinge shaft 16 as well, via the second joint piece 23 having made a slide movement in a radial direction.

Figure 23A:
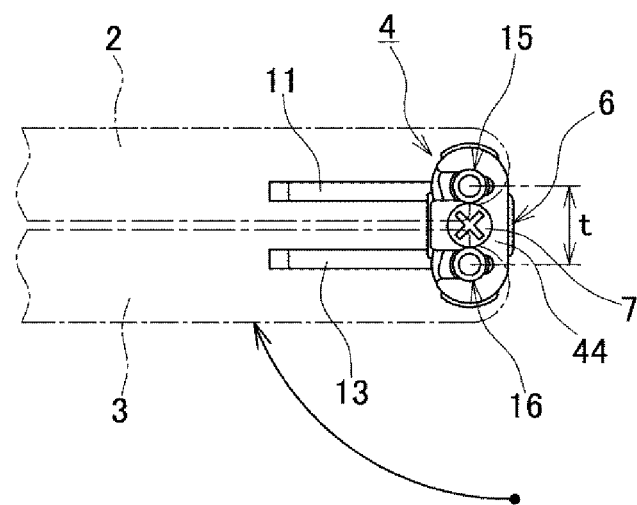
FIGS. 23A to 23C are explanatory views illustrating an operation of a biaxial hinge according to the invention, FIG. 23A being its side view in a state in which a second casing is opened 360 degrees relative to a first casing, FIG. 23B being a cross section showing a rotational position of a first A hinge shaft and a second A hinge shaft as well as a first joint piece and a second joint piece in the same state, FIG. 23C being a cross section showing a rotational position of a first B hinge shaft and a second B hinge shaft as well as a first joint piece and a second joint piece in the same state.
Figure 23B:
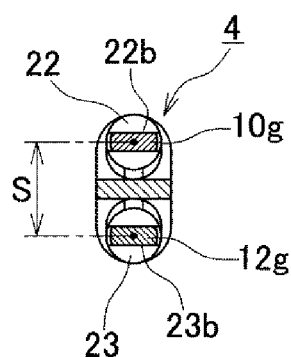
Figure 23C:
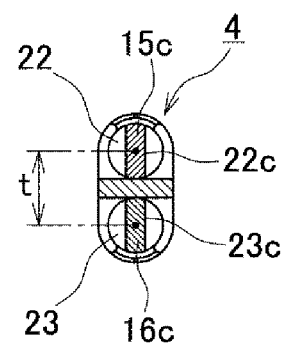

When a shift is made from the state in which a second casing 3 is opened 270 degrees relative to a first casing 2, as shown in FIG. 22A, to the state in which the both casings are opened 360 degrees relative to each other, as shown in FIG. 23A, the first A guide convex portion 10g of the first A hinge shaft 10 and the second A guide convex portion 12g of the second A hinge shaft 12 are both horizontally placed in parallel to each other with maintaining the distance s between their axes, and the first joint piece 22 and the second joint piece 23 have made a slide movement relative to the first A guide convex portion 10g of the first A hinge shaft 10 and the second A guide convex portion 12g of the second A hinge shaft 12, as shown in FIG. 23B. On the other hand, the first B guide convex portion 15c of the first B hinge shaft 15 and the second B guide convex portion 16c of the second B hinge shaft 16 are both vertically placed with maintaining the distance t between their axes, as shown in FIG. 23C, and the first joint piece 22 and the second joint piece 23 have made a further slide movement relative to the first B guide convex portion 15c of the first B hinge shaft 15 and the second B guide convex portion 16c of the second B hinge shaft 16 from the state shown in FIGS. 22A-22C. In other words, in a process of shift from the state in which the second casing 3 is opened 270 degrees relative to a first casing 2, as shown in FIGS. 22A-22C to the state in which the both casings are opened 360 degrees as shown in FIGS. 23A-23C, the distance s between the axes of the first A hinge shaft 10 and the second A hinge shaft 12 remains constant, and the distance t between the axes of the first A hinge shaft 15 and the second A hinge shaft 16 also remains constant. The rotation transmission from the first A hinge shaft 10 to the first B hinge shaft 15 is smoothly conducted via the first joint piece 22 having made a slide movement in a radial direction, and the one from the second A hinge shaft 12 to the second B hinge shaft 16 as well, via the second joint piece 23 having made a slide movement in a radial direction.

As described above, in the biaxial hinge 4 according to the invention of the terminal device comprising the first casing and the second casing which open and close, the distance between axes of the both casings should take the above-mentioned value s, while an optimal distance between axes of the two hinge shafts of the biaxial hinge used for the casings may take a value t different from the above-mentioned value s. Even in this case, the distance between axes of the first A hinge shaft 10 and the second A hinge shaft 12 of the biaxial hinge can be adjusted to the above-mentioned distance s, while distance between axes of the first B hinge shaft 15 and the second B hinge shaft 16 is still kept at the optimal value t, which allows for a rotation transmission between the first A and the second A hinge shafts 10, 12 and the first B and the second B hinge shafts 15, 16.

Next, reference is made to the operation of the synchronous rotation means 17, the first and the second friction torque generating means 25, 26 and the first and the second drawing means 33, 34. First, as per the synchronous rotation means 17, when only one of the first casing 2 and the second casing 3 opens and closes relative to other, the synchronous rotation means 17 simultaneously opens and closes the casing not starting opening and closing operations yet, so that the opening and closing operation can be quickly and easily accomplished. Namely, when the user, holding the first casing 2 with one hand, opens clockwise the second casing 3 by another hand (FIGS. 20A to 23C) from the state in which the second casing 3 is closed relative to the first casing 2 (FIGS. 19A-19C), the second B hinge shaft 16 coupled to the second A hinge shaft 12 rotates clockwise, and the first gear 21 attached to second B hinge shaft 16 with a rotation being restrained does so in the same direction (clockwise). When the second gear 21 rotates clockwise, the intermediate gear 19 rotates counterclockwise, as seen from above, via the upper bevel tooth portion 20c of the intermediate gear 19 meshed with the bevel tooth portion 21b of the second gear, and the first gear 20 attached to the first B hinge shaft 15, wherein the bevel tooth portion 20b of the first gear 20 meshes with the lower bevel tooth portion 20d of the intermediate gear 19 rotates counterclockwise as well. In this manner, the first B hinge shaft 15 rotates in a direction opposite to the rotation direction of the second B hinge shaft 16, and therefore the first casing 2 rotates at the same time as the second casing 3 in a direction opposite to the rotation direction of the latter, and thus the casings are opened and closed. Accordingly, as long as the second B hinge shaft 16 rotates, the opening and closing operation of the first casing 2 and the second casing 3 can be more easily and quickly accomplished than a biaxial hinge, wherein a rotation of the first hinge B shaft 15 is arrested by the selective rotation restraining means. In this manner, an enhanced operability is assured.

When the first casing 2 and the second casing 3 are opened and closed relative to each other, friction torque is generated under the effect of the first elastic means 38 between the first friction washer 28 and the second friction washer 31 rotating together with the first B hinge shaft 15 on one hand, and the first friction plate 27 and the second friction plate 30 on the other; in the same manner, friction torque is generated under the effect of the second elastic means 39 between the third friction washer 29 and the fourth friction washer 32 rotating together with the first B hinge shaft 15 on one hand, and the first friction plate 27 and the second friction plate 30 on the other; therefore, the first casing 2 and the second casing 3 can perform the stable stopping action at any angle within the predetermined angle range during the opening and closing operation of the first casing 2 and the second casing. In other words, the first elastic means 38 is compressed to enhance the pressurizing force on the first friction torque generating means 25, within the angle range in which the large diameter cam convex portion 36c of the first cam follower 36 is over the first large diameter cam convex portion 35d and the second large diameter cam convex portion 35e on the lower part of the cam plate 35 of the first and the second drawing means 33, 34, or within the range in which the small diameter cam convex portion 36d of the first cam follower 36 is over the first small diameter cam convex portion 35h and the second small diameter cam convex portion 35i on the lower part of the cam plate 35; in this manner, the stable stopping action of the first casing 2 and the second casing 3 is secured within the above-mentioned angle range. At the same time, the second elastic means 39 is compressed to enhance the pressurizing force on the first friction torque generating means 26, within the angle range in which the large diameter cam convex portion 37c of the second cam follower 37 is over the third cam convex portion 35f and the fourth cam convex portion 35g on the lower part of the cam plate 35, or within the range in which the small diameter cam convex portion 37d of the second cam follower 37 is over the third small diameter cam convex portion 35j and the fourth small diameter cam convex portion 35k on the lower part of the cam plate 35; in this manner, the stable stopping action of the first casing 2 and the second casing 3 is secured within the above-mentioned angle range.

The first drawing means 33 of the biaxial hinge 4 assumes a drawing function, when the large diameter cam convex portion 36c and the small diameter cam convex portion 36d of the first cam follower 36 respectively fall onto the cam concave portions 35l, 35m and the cam concave portions 35p, 35q on the lower part of the cam plate 35, so as to rotatably urge the first casing 2 and the second casing 3 in the opening direction or the closing direction in an automatic manner. In the same manner, the second drawing means 34 assumes a drawing function, when the large diameter cam convex portion 37c and the small diameter cam convex portion 37d of the second cam follower 37 respectively fall onto the cam concave portions 35n, 35o and the cam concave portions 35r, 35s on the upper part of the cam plate 35, so as to rotatably urge the first casing 2 and the second casing 3 in the opening direction or the closing direction in an automatic manner. In this embodiment, the drawing function is assumed slightly before the first casing 2 and the second casing 3 reach the opening and closing angle of 0 and 180 degrees. Since the respective large diameter cam convex portions 36c, 37c and the respective small diameter cam convex portions 36d, 37d are in press contact with each other, a strong friction torque is generated by means of a synergy effect of the first friction torque generating means 25 and the second friction torque generating means 26, so that the first casing 2 and the second casing 3 can stably stop at any opening and closing angle.

In the meantime, other possible embodiments include, though not shown in the drawings, alternative components of the first radial direction coupling means 14 for keeping the distance between axes of the first A hinge shaft 10 and the second A hinge shaft 12 at a predetermined value compatible with the distance between axes for the terminal device to which they are attached: as stated above, such components are not limited to the above described shaft portion holding members 141 to 144, but the first holding holes and the second holding holes can be provided instead of the respective first holding grooves 141c to 144c and the respective second holding grooves 141g to 144g, and thus the first radial direction coupling means can be composed of alternative shaft portion holding members with varying distances between axes of the respective holding holes. Furthermore, the joint pieces 22, 23 are not limited to the ones in the embodiment, but it is also possible that one or both of the first engaging groove 22b and the second engaging groove 22c as well as one or both of the first engaging groove 23b and the second engaging groove 23c are not guide concave portions, but guide convex portions.

Still further, each of the guide concave portions can be directed in a direction opposite to the embodiment. Still further, it is also possible that joint guide piece portions instead of the joint pieces 22, 23 are integrally provided on respective one end portions of the first A hinge shaft 10, the second A hinge shaft 12, the first B hinge shaft 15 and the second B hinge shaft 16, and convex or concave portions engaging with the joint guide piece portions are provided on respective other end portions. In the meantime, it is also possible to use spur gears for the first gear 20 and the second gear 21, whereby these gears are so designed that they directly mesh with each other, without intervention of an intermediate gear. Still further, it is also possible to use compression coil springs, etc. instead of disc springs used for the first and the second elastic means 38, 39. Accordingly, the present invention encompasses all the variant embodiments to which the skilled person could easily reach starting from the foregoing and drawings, always within the scope of the claims.

In the biaxial hinge according to the invention, the first casing and the second casing are not directly attached to the first B hinge shaft and the second B hinge shaft respectively, as in the conventional biaxial hinge, but the first B hinge shaft is attached to the first A hinge shaft via the first joint piece and in the same manner, the second B hinge shaft is attached to the second A hinge shaft via the second joint piece. And then, the first A hinge shaft and the second A hinge shaft are attached to the first casing and the second casing respectively. In this manner, when the rotation operation of the first casing is performed by means of the opening and closing operation of the terminal device, the rotation movement of the first A hinge shaft is transmitted to the first B hinge shaft via the first joint piece. Here, even if the distance between axes of the first A hinge shaft and the second A hinge shaft is different from that of the first B hinge shaft and the second B hinge shaft, the first joint piece slides in a radial direction corresponding to the rotation movement of the first A hinge shaft and the first B hinge shaft. In this manner, the rotation transmission between the first A hinge shaft and the first B hinge shaft is achieved with no trouble. In the same manner, the rotation transmission between the second A hinge shaft and the second B hinge shaft is achieved with no trouble due to the slide movement of the second joint piece in a radial direction. Therefore, if the distance between axes of the first A hinge shaft and the second A hinge shaft is set to be an optimal distance between axes of the first casing and the second casing, the opening and the closing operation by the biaxial hinge according to the invention is smoothly performed. In this manner, once the distance between axes by the first radial direction coupling means is changed depending on terminal devices with varying distances between axes, a biaxial hinge compatible various terminal devices can be manufactured, thus the biaxial hinge meets the needs for thinner terminal devices nowadays.

What is claimed is:

1. A biaxial hinge of a terminal device consisting of four shafts, said biaxial hinge coupling a first casing and a second casing, thereby these casings being openable and closable relative to each other, said biaxial hinge comprising:

a first hinge portion comprising a first A hinge shaft, one end thereof being attached to a first attaching bracket fixed to said first casing, a second A hinge shaft, one end thereof being attached to a second attaching bracket fixed to said second casing, and a first radial direction coupling means for said first A hinge shaft and said second A hinge shaft, thereby said hinge shafts being rotatable and a distance between axes thereof being adjustable, with said hinge shafts being further maintained in parallel to each other;

a second hinge portion comprising a first B hinge shaft disposed in an axial direction of said first A hinge shaft, a second B hinge shaft disposed in an axial direction of said first A hinge shaft, a second radial direction coupling means for said first B hinge shaft and said second B hinge shaft in a radial direction, thereby said hinge shafts being rotatable, with said hinge shafts being further maintained in parallel to each other, and a rotation controlling means for controlling a rotation of said first B hinge shaft and said second B hinge shaft; and an axial direction coupling means comprising a joint holder for arresting respective free ends of said first A hinge shaft, said first B hinge shaft, said second A hinge shaft and said second B hinge shaft for preventing all of said hinge shafts from moving away from each other in an axial direction, a first joint piece and a second joint piece, both being held by said joint holder for absorbing variations of a distance between axes and transmitting a rotation drive force to said first B hinge shaft and said second B hinge shaft.

2. The biaxial hinge according to claim 1, said first radial direction coupling means comprising a single or a plurality of shaft portion holding members replaceably mounted to said first A hinge shaft and said second A hinge shaft, said first A hinge shaft and said second A hinge shaft passing through said shaft portion holding members, thereby said first A hinge shaft and said second A hinge shaft being held by said shaft portion holding members.

3. The biaxial hinge according to claim 1, said rotation controlling means being a first friction torque generating means provided on said first B hinge shaft and a second friction torque generating means provided on said second B hinge shaft.

4. The biaxial hinge according to claim 1, said rotation controlling means being a first drawing means provided on said first B hinge shaft and a second drawing means provided on said second B hinge shaft.

5. The biaxial hinge according to claim 1, a first engaging groove engaging with a first A guide convex portion provided on an end portion of said first A hinge shaft being provided on one end portion of said first joint piece, said first engaging groove being slidable in a radial direction; a first engaging groove engaging with a second A guide convex portion provided on an end portion of said second A hinge shaft being provided on one end portion of said second joint piece, said first engaging groove being slidable in a radial direction; a second engaging groove engaging with a first B guide convex portion provided on an end portion of said first B hinge shaft being provided on one end portion of said first joint piece, said first engaging groove being slidable in a radial direction; and a second engaging groove engaging with a second B guide convex portion provided on an end portion of said second B hinge shaft being provided on one end portion of said second joint piece, said first engaging groove being slidable in a radial direction.

6. The biaxial hinge according to claim 1, said first joint piece and said second joint piece respectively comprising a first engaging groove engaging with a first A guide convex portion provided on an end portion of said first A hinge shaft and a second A guide convex portion provided on an end portion of said second A hinge shaft, said first engaging groove being slidable in a radial direction on said first A guide convex portion and said second A guide convex portion, and a second engaging groove engaging with a first B guide convex portion provided on an end portion of said first B hinge shaft and a second B guide convex portion provided on an end portion of said second B hinge shaft, said second engaging groove being slidable in a radial direction on said first B guide convex portion and said second B guide convex portion, said engaging grooves respectively integrally provided on respective one end portions of respective main body portions of respective said joint pieces.

7. The biaxial hinge according to claim 1, said first hinge portion, said second hinge portion and said axial direction coupling means being housed in a hinge case and thus fixed thereto.

8. The biaxial hinge according to claim 2, said shaft portion holding members respectively comprising a pair of holding grooves, said first A hinge shaft and said second A hinge shaft being inserted into said holding grooves, thereby said shaft portion holding members being disposed in an axial direction, one after another facing the opposite direction.

9. A terminal device using the biaxial hinge according to claim 1.

* * * * *